United States Patent
Hargreaves et al.

(10) Patent No.: US 8,454,254 B2
(45) Date of Patent: Jun. 4, 2013

(54) SUPPORT ACCESSORY FOR SPLIT KEYBOARD

(75) Inventors: William R. Hargreaves, Bellevue, WA (US); Mark Ando, Seattle, WA (US); Carsten Buus, Snohomish, WA (US); Jonathan H. Biggs, Lake Forest Park, WA (US)

(73) Assignee: Kinesis Corporation, Bothell, WA (US)

( * ) Notice: Subject to any disclaimer, the term of this patent is extended or adjusted under 35 U.S.C. 154(b) by 876 days.

(21) Appl. No.: 12/324,641

(22) Filed: Nov. 26, 2008

(65) Prior Publication Data
US 2009/0138637 A1    May 28, 2009

Related U.S. Application Data

(60) Provisional application No. 61/004,502, filed on Nov. 28, 2007.

(51) Int. Cl.
*G06F 3/02* (2006.01)
*G06F 1/16* (2006.01)
*A47B 21/04* (2006.01)
*A47B 21/03* (2006.01)

(52) U.S. Cl.
CPC ............. *G06F 3/02* (2013.01); *G06F 3/0208* (2013.01); *A47B 2021/0321* (2013.01); *A47B 21/04* (2013.01)
USPC ........................ 400/489; 400/472; 248/454

(58) Field of Classification Search
CPC ............... G06F 3/0208; G06F 3/0216; A47B 2021/0321; A47B 21/045; A47B 21/04
USPC ............. 400/472, 492, 489; 248/454, 456, 248/151, 188.2, 188.8, 431, 432, 166
See application file for complete search history.

(56) References Cited

U.S. PATENT DOCUMENTS

| 1,395,049 | A | 10/1921 | McNamara |
| 1,652,464 | A | 12/1927 | Tyberg |

(Continued)

FOREIGN PATENT DOCUMENTS

| JP | 61208113 A | * | 9/1986 |
| JP | 06012147 A | * | 1/1994 |

(Continued)

OTHER PUBLICATIONS

"Kinesis® MAXIM ™ Adustable Ergonomic Keyboard and Optional 10-key—User's Manual," Jun. 1997 Edition, pp. 1-21, Kinesis Corporation, Bothell, Washington.

(Continued)

*Primary Examiner* — Daniel J Colilla
(74) *Attorney, Agent, or Firm* — Seed IP Law Group PLLC

(57) ABSTRACT

An adjustable keyboard assembly and support mounts and keying layout are provided allowing a user to orient keying modules of the assembly in a variety of desired configurations. In one embodiment, the assembly includes pivoting support plates that allow the flexible adjustments. In another embodiment, at least one lift module is utilized to allow achieving multiple tenting angles expediently. In yet another embodiment, a modular support mount assembly is provided to allow the user to mount keying modules to a structure such as a chair using modular mounts that allow for easy and effective peripheral device supports and reconfiguration of the modular support mount assembly to support keying modules and peripheral devices of various sizes and shapes. Furthermore, a keying layout and assembly is provided to improve efficiency and intuitiveness of using a keying module and for programming the keying modules without use of a separate computer.

21 Claims, 27 Drawing Sheets

U.S. PATENT DOCUMENTS

| | | | |
|---|---|---|---|
| 2,040,248 A | | 5/1936 | Dvorak et al. |
| 2,192,594 A | | 3/1940 | Brand et al. |
| 3,087,701 A | * | 4/1963 | Wallace .................... 248/166 |
| 3,929,216 A | | 12/1975 | Einbinder |
| 3,945,482 A | | 3/1976 | Einbinder |
| 3,952,989 A | * | 4/1976 | Bannister Hatcher ........ 248/453 |
| 3,990,565 A | | 11/1976 | Felton et al. |
| 4,244,659 A | | 1/1981 | Malt |
| 4,378,553 A | | 3/1983 | McCall |
| 4,509,873 A | | 4/1985 | Ryan |
| 4,597,681 A | | 7/1986 | Hodges |
| 4,661,005 A | | 4/1987 | Lahr |
| 5,067,834 A | | 11/1991 | Szmanda et al. |
| 5,073,050 A | | 12/1991 | Andrews |
| 5,122,786 A | | 6/1992 | Rader |
| 5,137,384 A | | 8/1992 | Spencer et al. |
| 5,228,791 A | | 7/1993 | Fort |
| 5,322,967 A | | 6/1994 | Matsuda |
| 5,334,997 A | | 8/1994 | Scallon |
| 5,351,066 A | | 9/1994 | Rucker et al. |
| 5,375,800 A | | 12/1994 | Wilcox et al. |
| 5,388,921 A | | 2/1995 | Chung |
| 5,424,728 A | | 6/1995 | Goldstein |
| 5,454,652 A | | 10/1995 | Huellemeier et al. |
| 5,457,452 A | | 10/1995 | Skovronski |
| 5,574,481 A | | 11/1996 | Lee |
| 5,596,480 A | | 1/1997 | Manser et al. |
| 5,646,817 A | | 7/1997 | Manser et al. |
| 5,653,543 A | | 8/1997 | Abe |
| 5,732,928 A | * | 3/1998 | Chang ..................... 248/688 |
| 5,754,395 A | | 5/1998 | Hsu et al. |
| 5,769,551 A | | 6/1998 | Tsai et al. |
| 5,826,839 A | | 10/1998 | Chen |
| 5,841,635 A | | 11/1998 | Sadler et al. |
| 5,904,327 A | | 5/1999 | Cheng |
| 6,046,731 A | | 4/2000 | Griffin et al. |
| 6,081,207 A | | 6/2000 | Batio |
| 6,190,068 B1 | | 2/2001 | Chao |
| 6,320,519 B1 | | 11/2001 | Hsu et al. |
| 6,641,316 B1 | | 11/2003 | Goldstein et al. |
| 6,670,948 B2 | | 12/2003 | Zarek |
| 6,734,922 B1 | * | 5/2004 | Seo .................... 348/825 |
| 6,883,984 B2 | | 4/2005 | McLoone et al. |
| 7,109,893 B2 | * | 9/2006 | Chen ..................... 341/22 |
| 7,540,466 B2 | * | 6/2009 | Yang ..................... 248/688 |
| 2001/0033763 A1 | | 10/2001 | Goldstein et al. |
| 2005/0025549 A1 | | 2/2005 | McLoone |
| 2005/0025550 A1 | | 2/2005 | McLoone |
| 2005/0027665 A1 | | 2/2005 | Thiesson et al. |
| 2005/0052832 A1 | | 3/2005 | Monney et al. |
| 2005/0088414 A1 | | 4/2005 | Adan et al. |
| 2006/0043253 A1 | | 3/2006 | Huang et al. |

FOREIGN PATENT DOCUMENTS

| | | | |
|---|---|---|---|
| JP | 7160386 A | | 6/1995 |
| JP | 7175562 A | | 7/1995 |
| JP | 07250145 A | * | 9/1995 |
| JP | 2001044647 A | * | 2/2001 |
| WO | 9218926 A1 | | 10/1992 |

OTHER PUBLICATIONS

Photographs of representative Kinesis® MAXIM ™ keyboard, Kinesis Corporation, Bothell, Washington, first sold at least as early as Jun. 1997 (3 pages).

U.S. Appl. No. 11/342,286, filed Jan. 27, 2006, 45 pages.

Hedges, Joyce, "Reinventing the Keyboard", The Times, May 4, 1992, Section C, 1 page.

Kroemer, K.H. Eberhard, "Human Engineering the Keyboard", Human Factors, 1972, pp. 51-63, vol. 14, No. 1.

Nakaseko, M. et al., "Studies on Ergonomically Designed Alphanumeric Keyboards," Human Factors, 1985, pp. 175-187, vol. 27, No. 2.

Zipp, P. et al., "Keyboard design through physiological strain measurements," Applied Ergonomics, 1983, pp. 117-122, vol. 14.2.

* cited by examiner

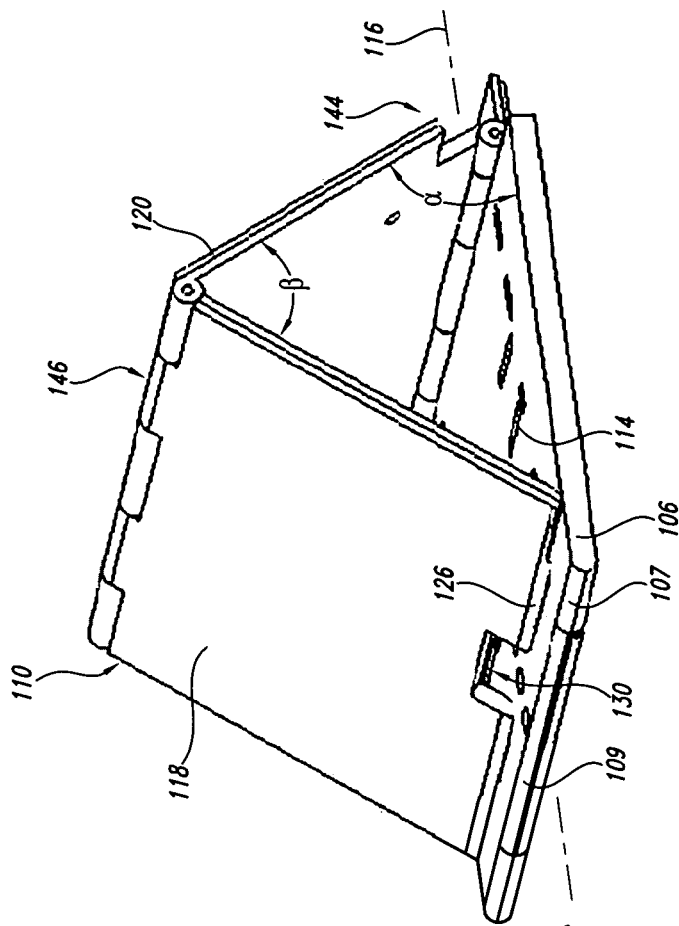
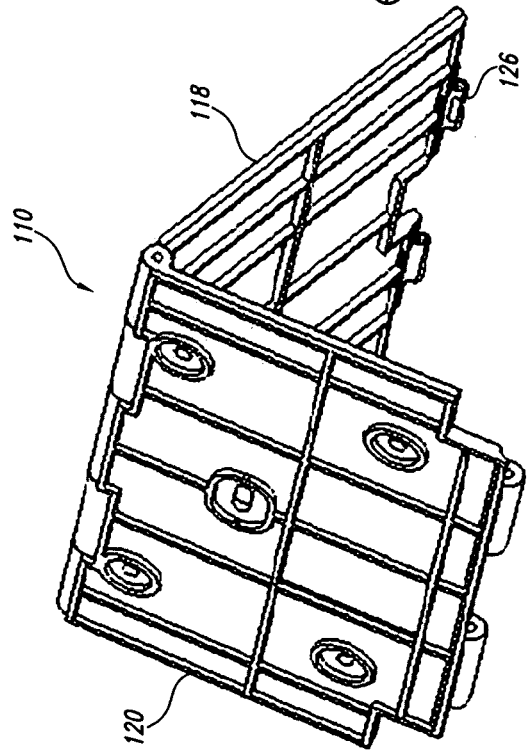
FIG. 3
FIG. 4

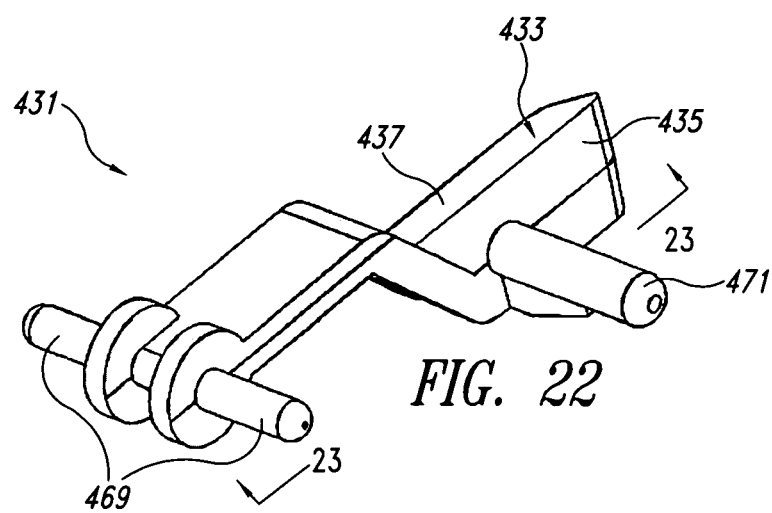
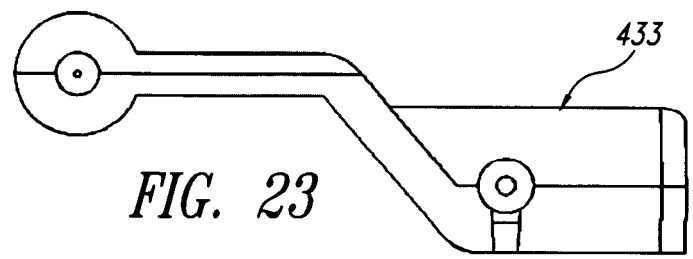

SUPPORT ACCESSORY FOR SPLIT KEYBOARD

CROSS-REFERENCE TO RELATED APPLICATION

This application claims the benefit under 35 U.S.C. §119 (e) of U.S. Provisional Patent Application No. 61/004,502 filed Nov. 28, 2007 where this provisional application is incorporated herein by reference in their entireties.

BACKGROUND

1. Technical Field

The present disclosure is generally related to keyboards, and more particularly, to an adjustable and ergonomic keyboard and layout and supporting structure thereof.

2. Description of the Related Art

Increasing use of computers and other hardware manipulated and controlled using keyboards has given rise to rethinking the ergonomic design of keyboards. Users often type on keyboards for long durations on consecutive days, giving rise to aches and pains in the users' hands and arms. Often prolonged use of keyboards with poor hand and arm positioning can lead to conditions such as tendonitis.

Some existing keyboards incorporate designs that result in different posturing of the user. The effectiveness of such designs varies; however one common drawback of conventional designs for adjustable keyboards is their lack of flexibility.

Typically, adjustable keyboards can be adjusted within a limited set of adjustment measurements that are decided by the manufacturer. For example, some adjustable keyboards can only be repositioned between a few different tenting angles (i.e., the angle at which the base of the keyboard is inclined with respect to the support surface) or splaying angles (i.e., the angle between inner lateral ends of split keyboards).

Other drawbacks of at least some conventional keyboards include lack of user acceptance. In particular, because for years computer users used early keyboard designs, they became accustomed to working with and developing muscle memory for remembering the position of the various keys on these keyboards. Therefore, users were resistant to trying new designs, fearing it would not be as comfortable or that it may reduce their typing efficiency.

Furthermore, adjustable keyboards that provide slightly more flexible adjustments are generally more costly to manufacture and thus more expensive to purchase.

The industry has also been slow in developing effective accessories for adjustable keyboards. For example, mountable supports that facilitate supporting a keyboard while attaching to another structure are typically deficient in effectively supporting computer peripherals and in allowing a user to reconfigure the support.

Applicants' co-pending application Ser. No. 11/788,733 aims to improve conventional keyboard designs. Although embodiments described in that application improve on conventional designs in areas such as cost, ease of assembly and use, and adjustment flexibility, some embodiments continue to have components that have high dimensional tolerances while other embodiments have certain flexibility drawbacks.

Other aspects of computer keyboards that have not been adequately addressed by conventional designs include keyboard layout and programming capabilities. For example, keyboard layouts for Apple® computers have been in large part very basic with few if any keys that have macros associated with them to carry out functions typically requiring multiple keys. Other keyboards with hot keys are often large in size due to positioning of the hot keys and the hot keys are either not efficiently programmable or require driver installation.

BRIEF SUMMARY

The present disclosure is generally related to keyboards, and more particularly, to an ergonomic and adjustable computer keyboard with a high level of user acceptance, which provides easy setup and adjustment, familiarity needing minimal adaptation, and having a cost not dramatically higher than a premium conventional computer keyboard.

According to one embodiment, an adjustable keyboard assembly for tenting first and second keying modules includes first and second anchor plates, each graduated with successive retaining structural features, a first support plate having a supporting portion and a retaining portion, the supporting portion configured to be coupled to the first keying module and pivotably mounted to the first anchor plate to pivot about at least one axis with respect to the first anchor plate, the retaining portion being coupled to the supporting portion and pivotably mounted to pivot about at least two axes with respect to the first anchor plate, the retaining portion having an anchoring structural feature configured to be removably engaged with the respective retaining structural features of the first anchor plate to vary and maintain a desired orientation of the first keying module, and a second support plate having a supporting portion and a retaining portion, the supporting portion configured to be coupled to the second keying module and pivotably mounted to the second anchor plate to pivot about at least one axis with respect to the second anchor plate, the retaining portion being coupled to the supporting portion and pivotably mounted to pivot about at least two axes with respect to the second anchor plate, the retaining portion having an anchoring structural feature configured to be removably engaged with the respective retaining structural features of the second anchor plate to vary and maintain a desired orientation of the second keying module.

According to another embodiment, an adjustable keyboard assembly for adjusting an orientation of first and second keying modules includes a first lift module configured to be fixedly coupled with respect to a lower portion of the first keying module for spacing a portion of the first keying module from a resting surface and configured to fix the first keying module at a variety of tenting angles between the lower portion of the first keying module and the resting surface, the first lift module including a coupling portion and at least first and second limbs, each limb being pivotably coupled with respect to the coupling portion and pivotably coupled with respect to each of the other limbs, the orientation of the first and second limbs with respect to the coupling portion and with respect to each other being variable to allow for varying of the tenting angle of the first keying module, and a second lift module configured to be fixedly coupled with respect to the lower portion of the second keying module for spacing a portion of the second keying module from a resting surface and configured to fix the second keying module at a variety of tenting angles between the lower portion of the second keying module and the resting surface, the second lift module including a coupling portion and at least first and second limbs, each limb being pivotably coupled with respect to the coupling portion and pivotably coupled with respect to each of the other limbs, the orientation of the first and second limbs with respect to the coupling portion and with respect to each other being variable to allow for varying of the tenting angle of the second keying module.

According to yet another embodiment, an adjustable keyboard assembly includes a first keying module having a proximal end and a distal end with respect to a user, an outer lateral end opposing an inner lateral end, an upper portion and a lower portion, the upper portion being configured to operatively retain a plurality of keys thereon, the lower portion having an adaptor plate including a plurality of fastening elements forming a first pattern and a protuberance rigidly attached thereto and configured to be coupled to an external structure, and a universal mount module including a plurality of modular mounting members each having a plurality of fastening elements forming the first pattern such that each universal mounting member can be coupled to at least one of another universal mounting member and to the adaptor plate of the first keying module to permit a user to mount the first keying module to the external structure and form at least one peripheral extension from one of the modular mounting members extending beyond at least one end of the first keying module to support a peripheral device.

According to still another embodiment, an adjustable keyboard assembly includes a first keying module having a proximal end and a distal end with respect to a user, an outer lateral end opposing an inner lateral end, an upper portion and a lower portion, the upper portion being configured to operatively retain a plurality of keys thereon, the first keying module including a first latching system including a first slide button fixedly coupled to a first latch to move therewith between a first position and a second position, the first latch having a latch coupling structure formed on at least one surface thereof, a second keying module having a proximal end and a distal end with respect to the user, an outer lateral end opposing an inner lateral end, an upper portion and a lower portion, the upper portion being configured to operatively retain a plurality of keys thereon, the second keying module having a second latching system including a second slide button fixedly coupled to a second latch to move therewith between a first position and a second position, the second latch having a latch coupling structure formed on at least one surface thereof, and a tethering module including first and second tether members movably coupled to each other, the first tether member being coupled to the first keying module and the second tether member being coupled to the second keying module, allowing the first and second keying modules to move with respect to each other, each of the first and second tether members having a cylindrical projection elongated about an axis and including a complementary coupling structure formed in the cylindrical projection including a wedge shaped recess in the cylindrical projection having circumferential terminal ends and at least two surfaces including a first tapered surface tapered at a first angle with respect to the axis, the latch coupling region including a wedge shape formed by at least two surfaces thereof proximate a corner of the latch, the coupling region having a second tapered surface tapered at a second angle with respect to the axis complementary to the first angle such that when the latch and complementary coupling structures are engaged, at least a portion of the first and second tapered surfaces mate.

According to a further embodiment, a computer keyboard layout includes a plurality of driverless hot keys programmed with distinct functions arranged adjacent a plurality of standard keys toward an outer lateral end of the keyboard layout, the plurality of standard keys being substantially laterally aligned with the plurality of standard keys.

According to yet a further embodiment, a computer peripheral assembly includes a computer peripheral device, a USB OTG port, a memory chip in electronic communication with the USB OTG port, a plurality of activation keys or buttons, the USB OTG port being configured to be electronically coupled to an external USB device and enable the computer peripheral device to act as a host device to the external USB device, thereby permitting programming at least one of the activation keys or buttons with functions associated with particular features of the external USB device wherein the USB OTG port communicates with the memory chip to store the programmed and assigned functions.

According to still a further embodiment, a method of programming and assigning desired functions to control features of a computer peripheral device, respectively, the computer peripheral device including a USB OTG port; a memory chip in electronic communication with the USB OTG port; a plurality of activation keys or buttons, the USB OTG port being configured to be electronically coupled to an external USB device and enable the computer peripheral device to act as a host device to the external USB device, includes electronically coupling the USB OTG port to the external USB device, identifying at least one of the control features of the computer peripheral, activating control feature or features of the external USB device associated with the desired function, and ending the programming session.

BRIEF DESCRIPTION OF THE SEVERAL VIEWS OF THE DRAWINGS

FIG. 3 is a rear isometric view of a portion of a support plate of the adjustable keyboard assembly of FIG. 1 according to one embodiment.

FIG. 4 is a front isometric view of a support plate coupled to an anchor plate of the adjustable keyboard assembly of FIG. 1 according to one embodiment.

FIGS. 22 and 23 are isometric and side views of a latch of the adjustable keyboard assembly of FIG. 17, respectively, according to one embodiment.

DETAILED DESCRIPTION

Figure 1:
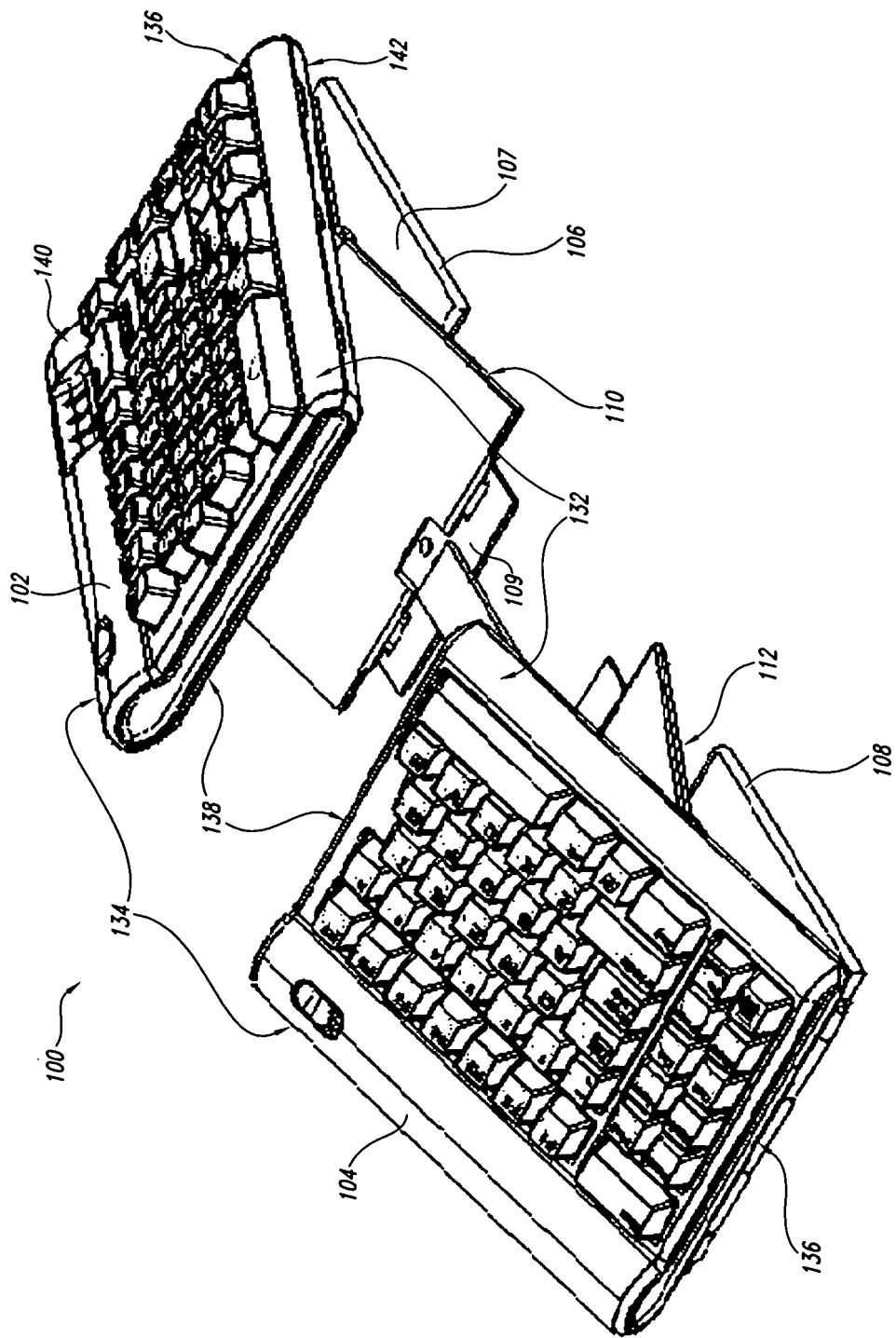
FIG. 1 is an isometric view of an adjustable keyboard assembly according to one embodiment in a first tenting configuration.
Figure 2:
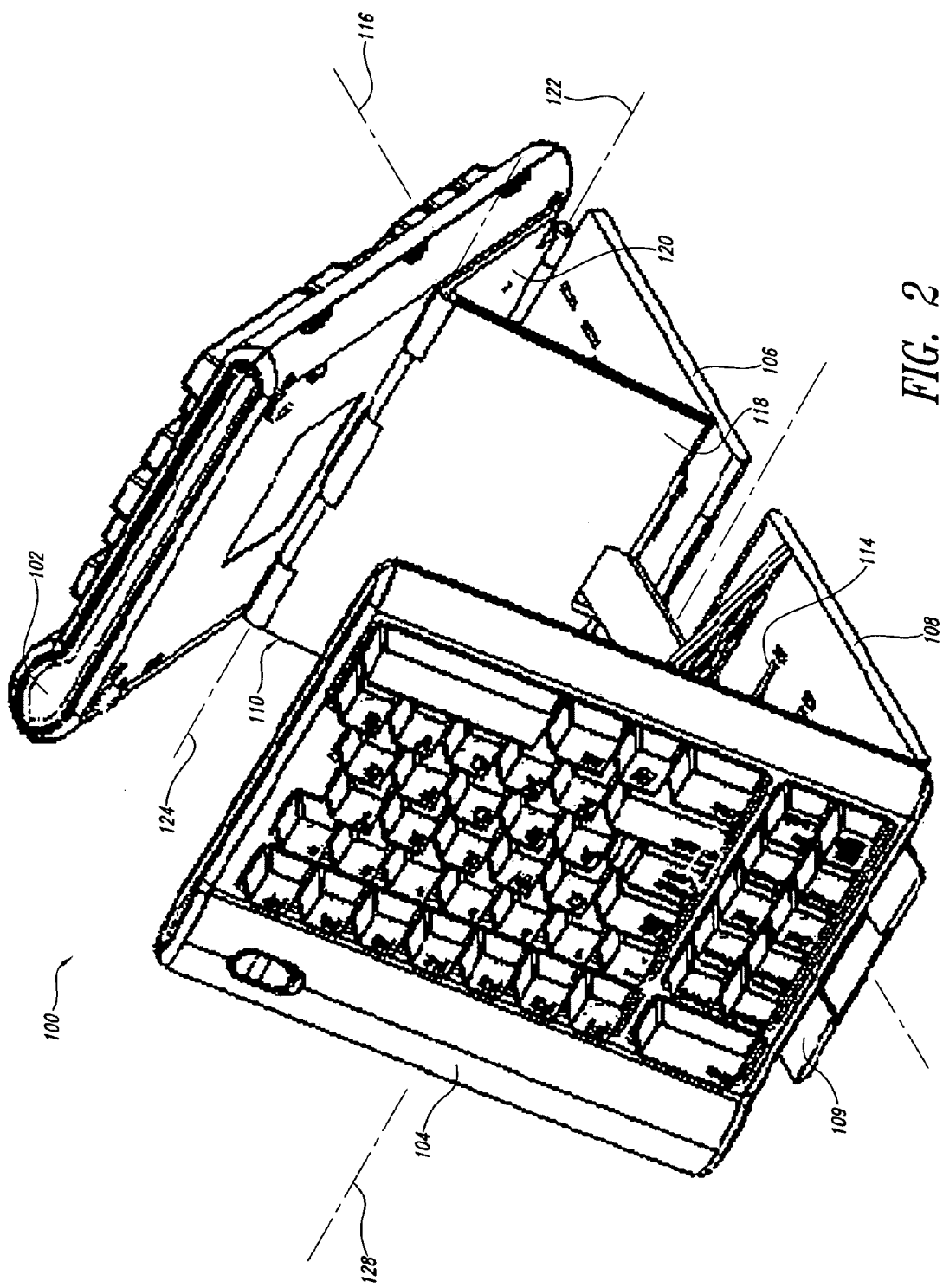
FIG. 2 is an isometric view of the adjustable keyboard assembly of FIG. 1 in a second tenting configuration.

FIG. 1 illustrates an adjustable keyboard assembly 100 according to one embodiment. The adjustable keyboard assembly 100 includes first and second keying modules 102, 104, first and second anchor plates 106, 108, and first and second support plates 110, 112. As illustrated in FIG. 2, the first and second anchor plates 106, 108, each include a plurality of retaining structural features 114 arranged sequentially along a longitudinal axis 116 of the assembly 100. In some embodiments, the retaining structural features 114 are equally spaced, and in other embodiments they are not equally spaced.

Each of the first and second support plates 110, 112, includes a retaining portion 118 and a supporting portion 120. The following description is directed to the first keying module 102 and a similar and oppositely situated configuration applies to the second keying module 104. The supporting portion 120 is coupled to the first keying module 102 along a surface thereof. The supporting portion 120 is pivotably mounted to pivot about at least a first axis 122 with respect to the first anchor plate 106. The retaining portion 118 is pivotably mounted to pivot about at least first and second axes 122, 124 with respect to the first anchor plate 106. For example, the retaining portion 118 can be coupled to the supporting portion 120 toward a first end of the retaining portion 118 and the supporting portion 120 can be pivotably coupled to the first anchor plate 106 to pivot about the first axis 122.

FIG. 3 illustrates a rear view of a portion of the first support plate 110 in isolation according to one embodiment. FIG. 4 illustrates a front view of the first support plate 110 with its supporting portion 120 pivotably coupled to the anchor plate 106 and its retaining portion 118 anchored in the first anchor plate 106, according to one embodiment. The following describes this arrangement with respect to the first support plate 110 and substantially the same and opposite arrangement applies to the second support plate 112.

Referring to FIGS. 3 and 4, the retaining portion 118 includes an anchoring structural feature 126 configured to be removably engaged to the respective retaining structural features 114 of the first anchor plate 106 to maintain a desired orientation of the first support plate 110, and therefore, of the first keying module 102 by pivoting the retaining and supporting portions 118, 120. As illustrated in FIG. 4, the retaining structural features 114 can also be arranged or spaced sequentially along the lateral axis 128 (FIG. 2) of the adjustable keyboard assembly 100. The anchoring structural features 126 can also be laterally arranged such that they correspond to the positioning of the retaining structural features 114, and can easily be inserted therein to retain the supporting portion 120 at a particular angle with respect to the first anchor plate 106 and bring about a desired tenting angle of the first keying module 102.

The retaining and anchoring structural features 114, 126 can include any combination of complementary structures that, when engaged, maintain the retaining portion 118 of the support plates 110, 112 in a desired configuration. For example, in one embodiment the retaining structural feature 114 can include a recess, receptacle, groove, or the like, while the anchoring structural feature 126 can include a protrusion, a tab, a hook, or other similar structure that can be removably, captively engaged in the retaining structural feature 114. In some embodiments, the anchoring structural features 126 can be fabricated from a different material than a remaining portion of the support plates 110, 112. For example, the anchoring structural features 126 can be fixedly coupled to the retaining portion 118 and be a separately fabricated or molded element that attaches to a metallic retaining portion 118. In such embodiments, the retaining portion 118 can be made from a stronger more rigid material while the retaining structural features 126 are made from a more formable material, such as plastic, for forming particular engagement features thereon.

As discussed above, the retaining and anchoring structural features 114, 126 can be laterally spaced where there is more than one of them. Alternatively, in some embodiments, the retaining and anchoring structural features 114, 126 can be longer, each extending from toward one end of the anchor plate 106 and retaining portion 118, respectively, to an opposing end thereof.

In the illustrated embodiment of FIGS. 3 and 4 there are two anchoring structural features 126 corresponding to pairs of retaining structural features 114 spaced along the longitudinal axis 116. In such an embodiment, a recess 130 can be incorporated between the two anchoring structural features 126 to allow a user to easily lift the first support plate 110, pivoting it about the first axis 122 and reposition the anchoring structural features 126 in a different set of retaining structural features 114 to reconfigure the first support plate 110, and therefore, reposition the first keying module 102.

Referring back to FIG. 1, in one embodiment, the first and second keying modules 102,104 each includes a proximal end 132 and a distal end 134 with respect to a user, and an outer lateral end 136 laterally opposing an inner lateral end 138 with respect to the user. The first and second keying modules 102, 104 further include an upper portion 140 and a lower portion 142, the upper portion 140 being configured to operatively retain a plurality of keys thereon and the lower portion 142 being configured to be positionable adjacent a first portion of a surface of the supporting portion 120 of the respective first and second support plates 110, 112.

As illustrated in FIG. 4, the supporting portion 120 of the first and second support plates 110, 112, can include first and second end regions 144, 146. In the illustrated embodiment, the first end region 144 is pivotably coupled to the first anchor plate 106, the second end region 146 being pivotably coupled to the retaining portion 118. When the anchoring structural feature 126 of the retaining portion 118 is engaged with the retaining structural feature 114 of the first anchor plate 106, the retaining portion 118 maintains the first support plates 110 at a desired orientation. This orientation can be varied by varying a first angle α with respect to the first anchor plate 106, and a second angle β with respect to the supporting portion 120.

In one embodiment, the first and second anchor plates 106, 108 can be made from a unitary body of material forming an integral anchor plate, the retaining portions 120 of the respective support plates 110, 112 engaging retaining structural features 114 formed in different portions of the integral anchor plate along the longitudinal axis 116.

Figure 5:
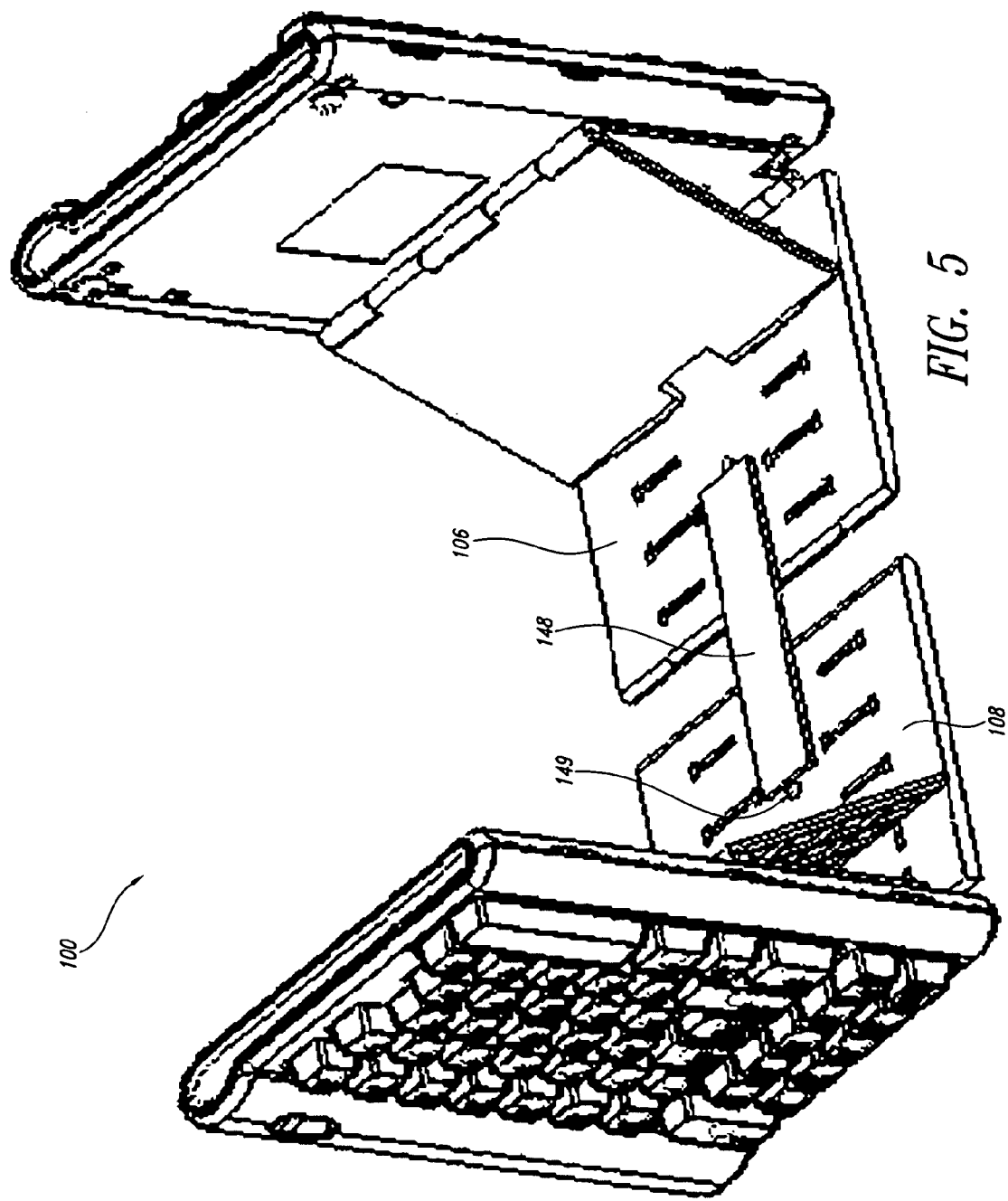
FIG. 5 is an isometric view of the adjustable keyboard assembly of FIG. 1 in a third tenting configuration.

In another embodiment, as illustrated in FIG. 5, the adjustable keyboard assembly 100 can include a tethering member 148 extending between and aligning the first and second anchor plates 106, 108 with respect to each other. The tethering member 148 is configured to be coupled to the first and second anchor plates 106, 108, and maintain a desired space therebetween. The tethering member 148 can be removably coupled on opposing sides thereof to the respective anchor plates 106, 108 via complementary structural features such as one or more tabs or protrusions formed on the underside of the tethering member 148 and a plurality of sequential receptacles 149 on the upper surface of the respective anchor plates 106, 108. For example, the tethering member 148 can include thumb screws to engage corresponding concentric openings in the anchor plate 106, 108 and firmly attach the tethering member 148.

Figure 6:
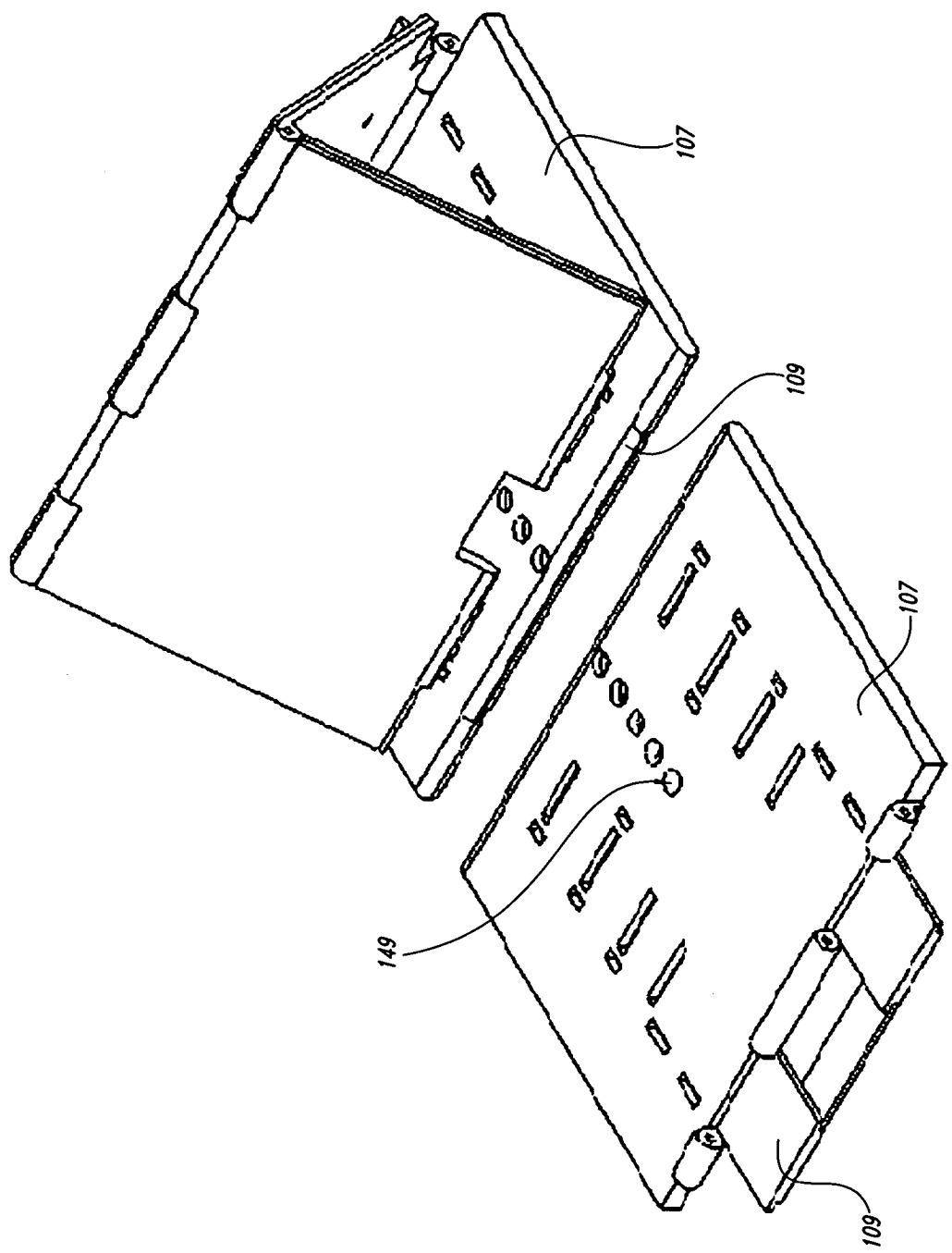
FIG. 6 is an isometric view of a support plate coupled to an anchor plate and an anchor plate of the adjustable keyboard assembly of FIG. 1 having an extendable portion according to one embodiment.

In one embodiment as illustrated in FIGS. 1-6, the anchor plates 106, 108 respectively include a base plate 107 and an extendable plate 109 configured to be slidably coupled to the base plate 107. The retaining structural features 114 can be incorporated on both the base plate 107 and the extendable plate 109. In FIG. 1, the respective extendable plates 109 are in an extended position. When extended, the plate 109 facilitates supporting the corresponding keying module 102, 104 at smaller tenting angles such as 5 to 50 degrees. For larger tenting angles, such as up to and including 90 degrees, the retaining structural features 114 in the base plate 107 are used and the extendable plate 109 can be retracted as shown in FIGS. 2, 5 and 6. As shown in FIGS. 2 and 6, when retracted, the extendable plate 109 can slide beyond the outer lateral end of the base plate 107 with respect to the user, providing added support and stability for the outer lateral ends 136 of the first and second keying modules 102, 104, respectively.

Therefore, the adjustable keyboard assembly 100 can be easily and expediently adjusted to produce a variety of tenting angles, even distinct tenting angles for each of the first and second keying modules 102, 104, while allowing for separation of the keying modules 102, 104, to suit the user's orientation preferences and improve ergonomics of the adjustable keyboard assembly 100.

Figure 7:
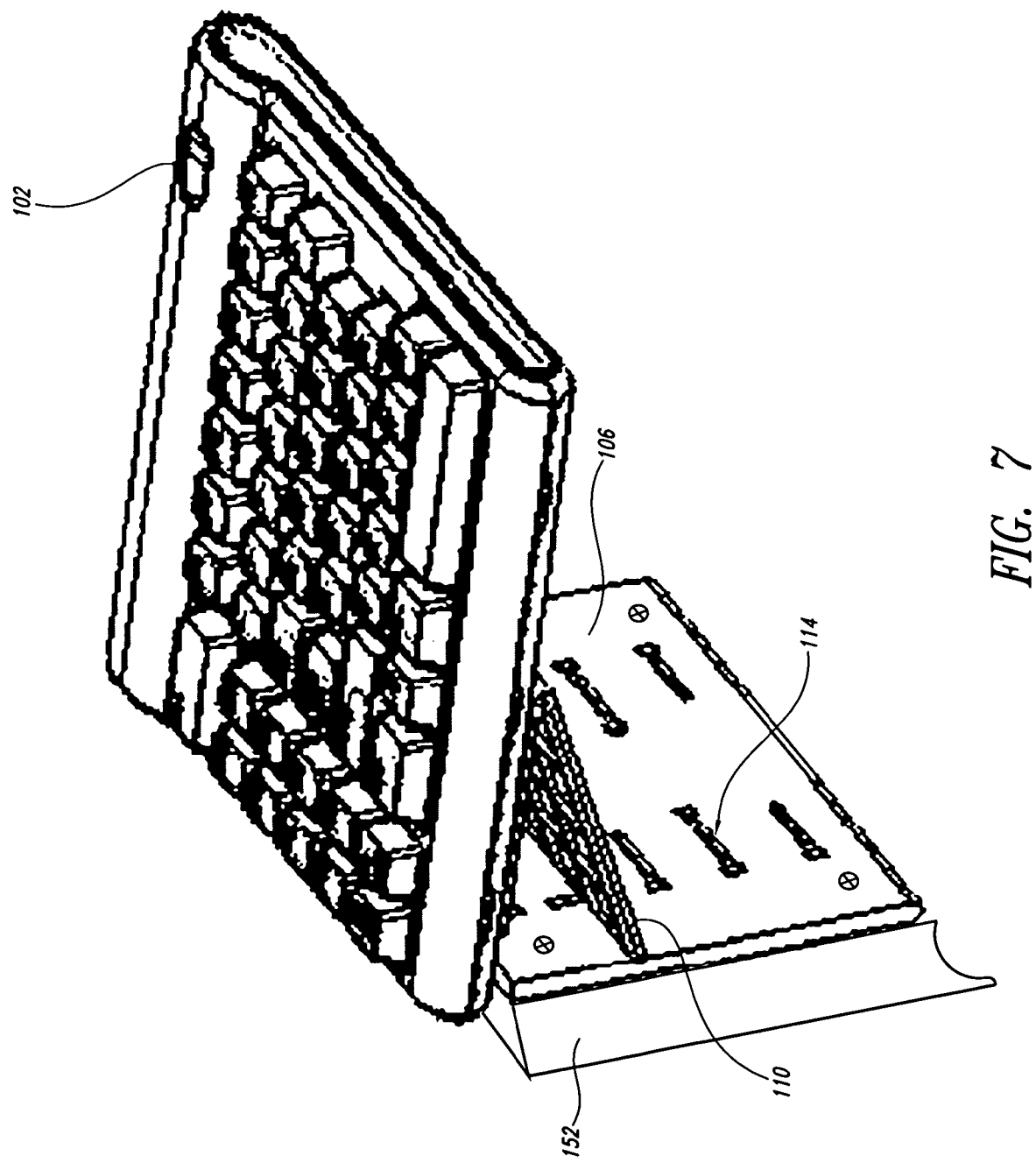
FIG. 7 is an isometric view of a portion of the adjustable keyboard assembly of FIG. 1 in a fourth tenting configuration.

In addition to the wide variety of orientations that are made possible by the adjustable keyboard assembly 100 on a horizontal surface, in some embodiments, the adjustable keyboard assembly 100 can be mounted on a vertical support structure 152 as illustrated in FIG. 7. In FIG. 7, only the first keying module 102 is illustrated for clarity of illustration. The second keying module 104 can be similarly mounted on the opposing side of the vertical structure 152 or on a different vertical structure. For example, the anchor plate 106 can be fastened or otherwise mounted on the vertical structure 152 and the retaining portion 118 of the first support plate 110 can be adjusted so that the anchoring structural features 126 (FIG. 3) thereof engage corresponding retaining structural features 114 in the anchor plate 106 to adjust the tenting angle of the keying module 102. In this manner the spaces under the keying modules 102, 104, are available for placing other computer peripherals such as a computer mouse. Furthermore, such an arrangement can be desirable in applications where space is limited, such as in laboratories and crafts or vessels, such as a watercraft, aircraft, space craft and military vehicles such as tanks.

Figure 8:
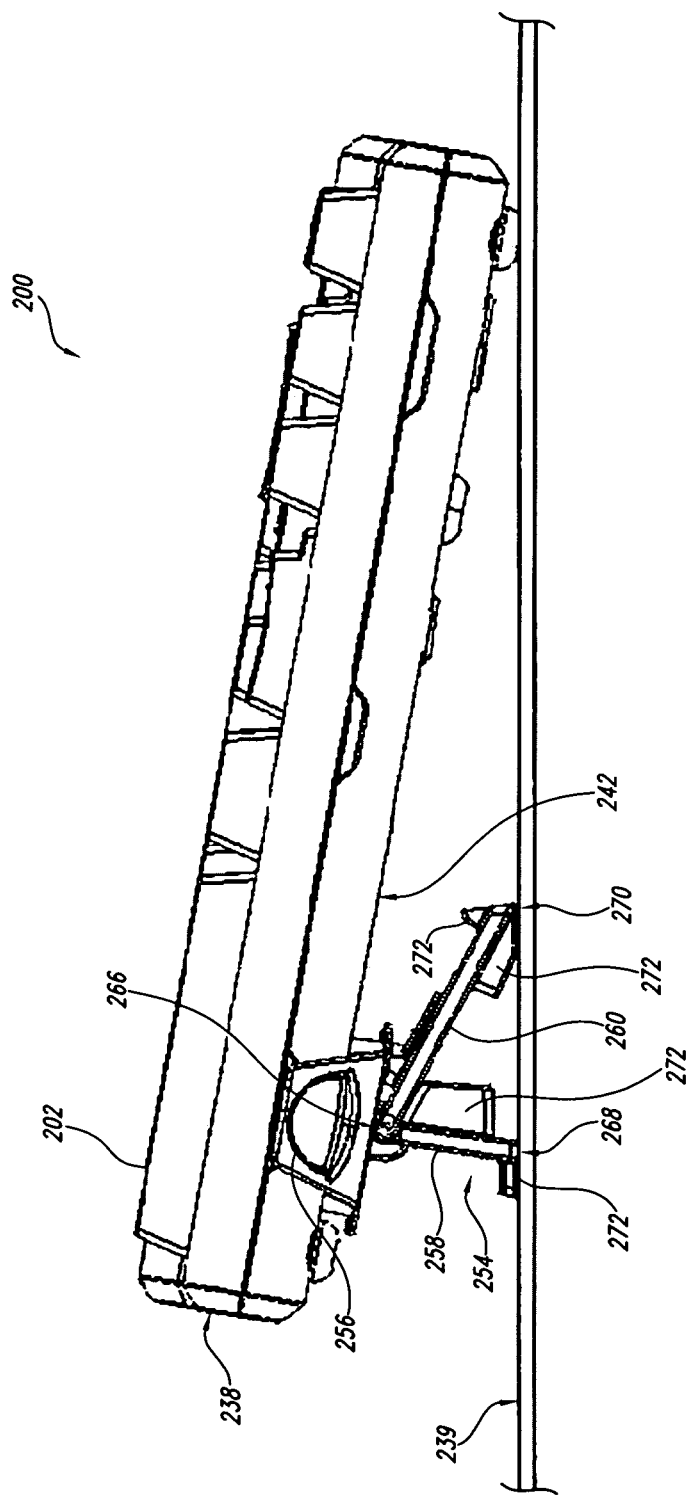
FIG. 8 is a front elevation view of an adjustable keyboard assembly according to another embodiment in a first tenting configuration.

FIG. 8 illustrates another embodiment, in which an adjustable keyboard assembly 200 includes first and second keying modules similar to the first and second keying modules 102, 104, discussed above. For purposes of brevity, one side of the adjustable keyboard assembly 200 will be described for this embodiment in conjunction with one keying module 202. In this embodiment, the tenting angle of the keying module 202 is adjusted using a lift module 254. According to one embodiment, the lift module 254 is configured to be fixedly coupled with respect to the lower portion 242 of the keying module 202 for spacing a portion of the keying module 202, such as a region adjacent the inner lateral end region 238, from a resting surface 239, to form the tenting angle between the lower portion 242 of the keying module 202 and the resting surface 239.

The lift module 254 includes a coupling portion 256 for fixedly coupling the lift module 254 to the keying module 202, and first and second limbs 258, 260 for spacing and supporting the keying module 202 on the resting surface 239. The first and second limbs 258, 260 are pivotably coupled to the coupling portion 256 and pivotably coupled with respect to each other. Accordingly, the orientation of the first and second limbs 258, 260 with respect to the coupling portion 256, and with respect to each other is variable to allow varying the tenting angle of the keying module 202.

Figure 9:
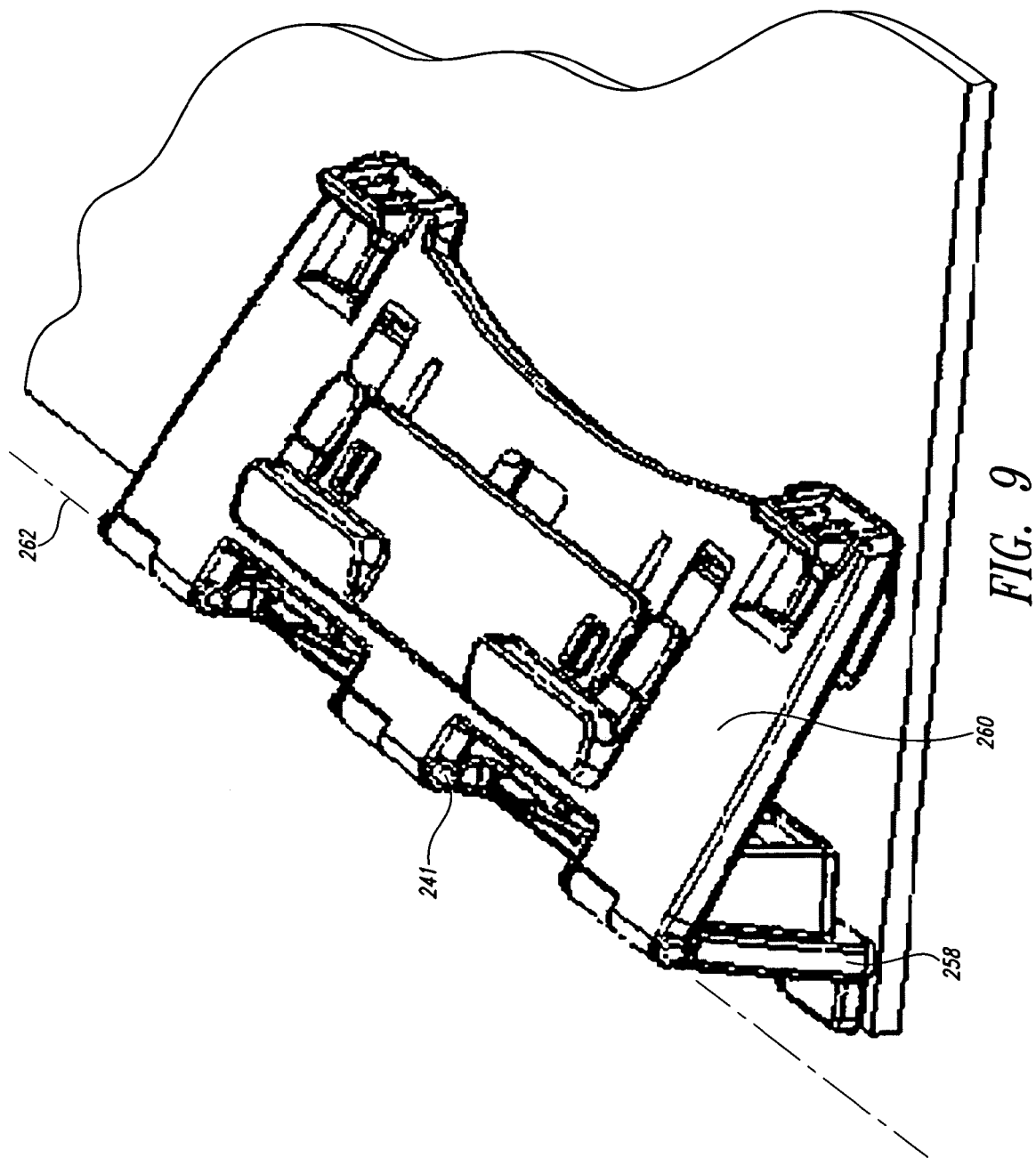
FIGS. 9 and 10 are isometric views of respective portions of a lift module of the adjustable keyboard assembly of FIG. 8.
Figure 10:
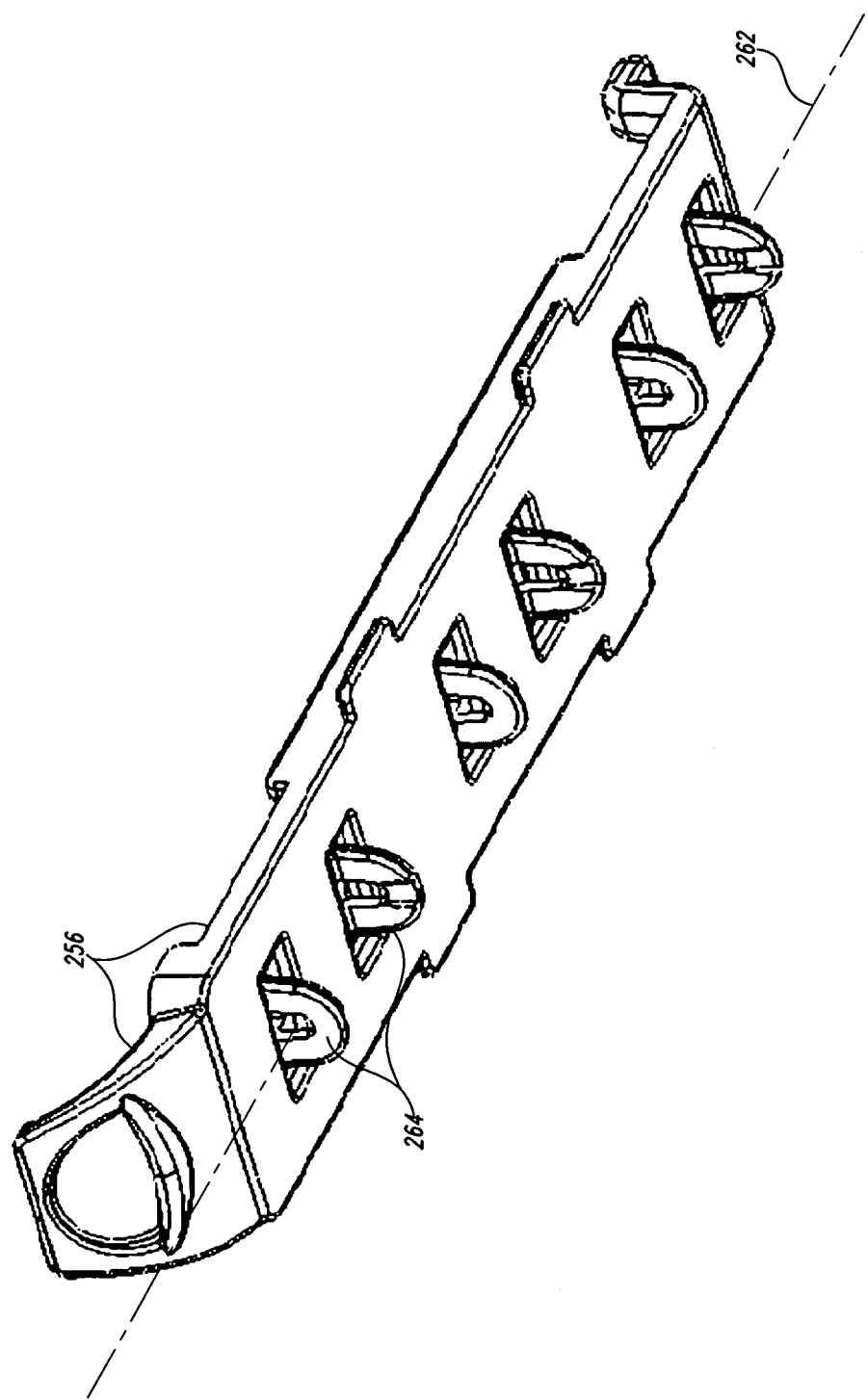

In one embodiment, as illustrated in FIGS. 9 and 10, the first and second limbs 258, 260 are coupled along a common pivot axis 262 about which the first and second limbs 258, 260 can pivot with respect to the coupling portion 256 and with respect to each other. For example, the first and second limbs 258, 260 can be hingedly coupled to one another as illustrated in FIG. 9, and hingedly coupled to a plurality of hinge support structures 264, which in one aspect protrude from an underside of the coupling portion 256 as shown in FIG. 10. In one embodiment, a lockable hinge 241 can be used to further facilitate retention of the limbs 258, 268, in desired respective positions.

As illustrated in FIG. 8, in one embodiment, the first and second limbs 258, 260 are each pivotably coupled to the coupling portion 256 toward respective first ends 266 thereof. The first and second limbs 258, 260, each include respective second ends 268, 270, opposed to their first end 266. Each of the first and second limbs 258, 260 can include at least one stabilizing structural feature 272 that forms at least one resting surface having a shape to complement the resting surface 239. For example, the stabilizing structural features 272 can include a flat surface. The stabilizing structural features 272 can be oriented such that their flat surface is substantially parallel to the resting surface 239 when the corresponding lift module 254 is oriented to bring about a predetermined tenting angle. The stabilizing structural features 272 can also be fitted with a resilient pad to further stabilize the keying module 202 against lateral movement. The stabilizing structural features 272 can be formed between the first and second ends 266, 268, 270 of the first and second limbs 258, 260, respectively, or toward one of the ends 266, 268, 270, for flexibility in achieving a wider variety of tenting angles, catering to users' preferences, as described below.

Figure 11:
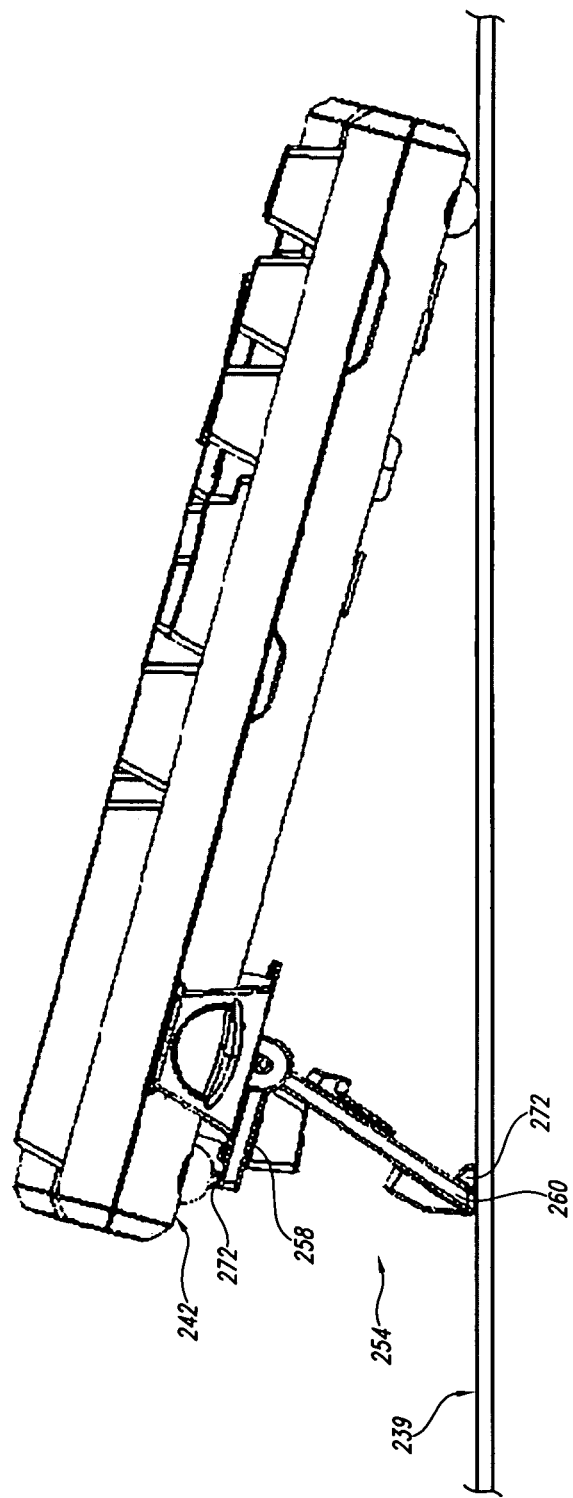
FIG. 11 is a front elevation view of the adjustable keyboard assembly of FIG. 8 in a second tenting configuration.

For example, in the orientation shown in FIG. 8, the first limb 258 is shorter than the second limb 260 and substantially upright while the second limb 260 extends outwardly at an angle to produce a desired tenting angle, such as approximately 10 degrees with respect to the resting surface 239. Two respective stabilizing structural features 272 rest on the surface to stabilize the lifting module 254 in the shown orientation. In FIG. 11, the lift module 254 is rotated until one of the stabilizing structural features 272 of the longer second limb 260 rests on the resting surface 239. One of the stabilizing structural features 272 of the first limb 258 can in one aspect rest against the lower portion 242 of the keying module. In this configuration, a larger tenting angle than that shown in FIG. 8 can be achieved, for example 40-80 degrees.

Figure 12:
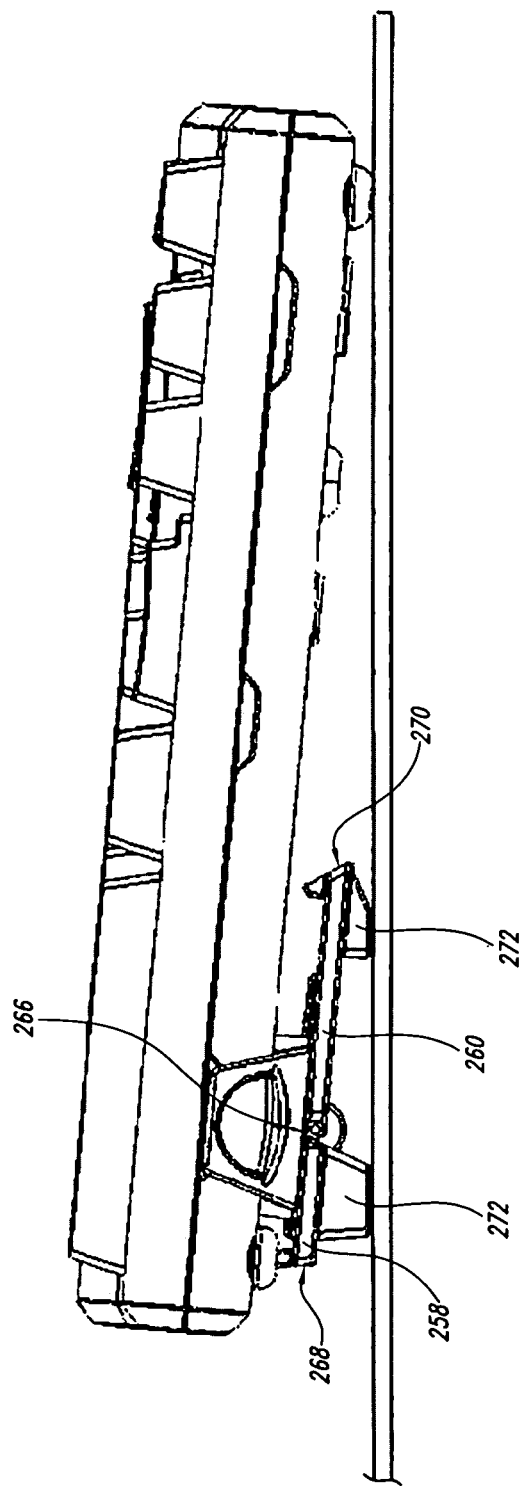
FIG. 12 is a front elevation view of the adjustable keyboard assembly of FIG. 8 in a third tenting configuration.

To achieve a smaller tenting angle, the first and second limbs 258, 260 can be pivoted with respect to each other after releasing the lockable hinge to increase the angle therebetween or position them such that the angle between them is substantially 180 degrees. For example, FIG. 12 illustrates the first and second limbs 258, 260 extending along a substantially common plane. Furthermore, the stabilizing structural feature 272 positioned between the first and second ends 266, 268 of the first limb 258 is larger than the stabilizing structural feature 272 toward the second end 270 of the second limb 260, resulting in another tenting angle, smaller than the one shown in FIG. 8, for example, approximately 5 degrees. As the illustrated embodiments demonstrate, the stabilizing structural features 272 can be positioned on either or both sides of the first and second limbs 258, 260 to stabilize the limbs 258, 260 on the resting surface 239 at a variety of angles when the limbs 258, 260 are rotated about the pivot axis 262 (FIG. 9) with respect to the coupling portion 256 and/or with respect to each other.

Other configurations of the stabilizing structural features 272 and locations on the first and second limbs 258, 260, that can be used to orient the first and second limbs 258, 260 in different positions are contemplated to be within the scope of the present disclosure. Furthermore, in other embodiments, more than two limbs can be incorporated to further add to the flexibility of modifying the positioning or tenting configuration of the keying modules.

Figure 13:
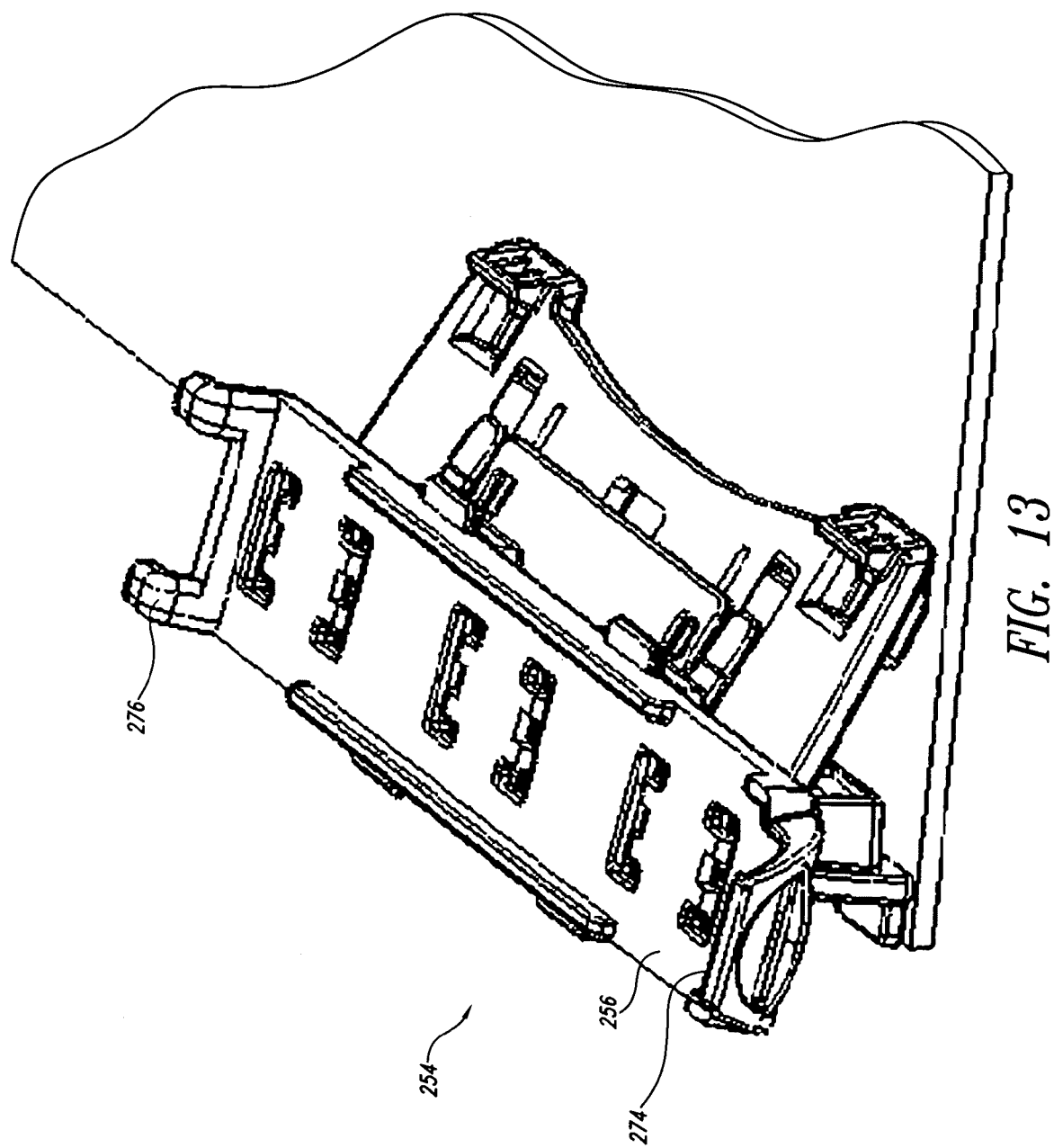
FIG. 13 is an isometric view of a lift module of the adjustable keyboard assembly of FIG. 8 according to one embodiment.

FIG. 13 illustrates one embodiment of the coupling portion 256. According to one aspect, the coupling portion 256 includes opposing coupling members 274, 276 that are configured to be removably engaged to the lower portion 242 or other portion of the keying module 202 (FIG. 8). For example, the coupling members 274, 276 can include receptacles, hooks, or the like that are elastically deformable or resilient, to snap into place about a complementary structure on the lower portion 242 of the keying module 202. Additionally, or alternatively, the coupling members 274, 276 can receive the lower portion 242 of the keying module 202 on proximal and distal ends thereof with respect to the user without formation of complementary features on the keying module 202. For example, the distance between the coupling members 274, 276 can be less than a lateral dimension of the keying module 202 such that the coupling members 274, 276 elastically or resiliently expand to receive the lower portion 242 and tend to retract back to their original position to secure the lower portion or other portion of the keying module 202 therebetween. In such embodiments, the lifting modules 254 can be used with existing split keyboards.

As discussed earlier, conventional computer keyboard accessories, such as mountable support structures, have not adequately addressed user needs. In particular, conventional mountable support structures typically suffer from drawbacks such as either requiring computer peripherals, such as a computer mouse, to be permanently built in the keyboard or in cases where a tray has been provided, the peripherals tend to frequently fall over the edges of the tray due to slipping off or being bumped off by the user's hands or arms during movements associated with typing, particularly where the keyboard is tilted or tented in the case of split keyboards. Furthermore, conventional designs are limited in flexibility with respect to reconfiguring the size of the support mount and typically require distinct supports for right and left split keyboards.

Figure 14:
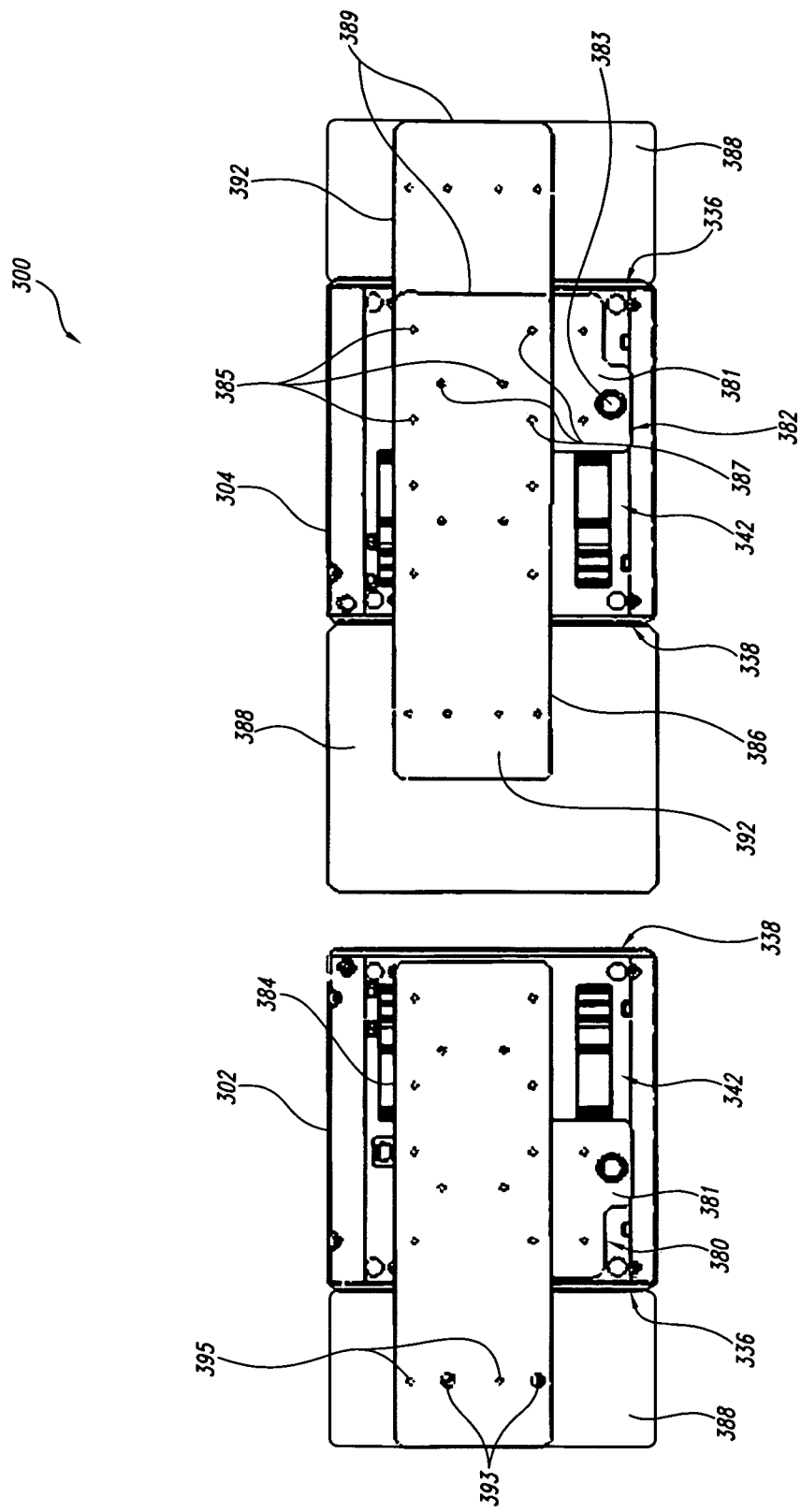
FIG. 14 is a bottom view of an adjustable keyboard assembly according to yet another embodiment.

FIG. 14 illustrates one embodiment of a keyboard assembly 300 that includes first and second keying modules 302, 304 and first and second adaptor plates 380, 382 fixedly coupled to respective lower portions 342 of the first and second keying modules 302, 304. The keyboard assembly 300 further includes first and second universal mount modules 384, 386, and at least one peripheral support member 388. In one aspect, the first and second universal mount modules 384, 386 include an upper surface and a lower surface, the universal mount modules 384, 386 being removably coupled to the first and second adaptor plates 380, 382, respectively, a structure mount portion 381 of the first and second adaptor plates 380, 382 being configured to be removably coupled to a structure, such as an arm 390 of a chair 391 (FIG. 15A).

The respective structure mount portions 381 include a protuberance 383 configured to facilitate coupling of the keyboard assembly 300 to the chair 390. The structure mount portions 381 extend beyond an edge of the corresponding universal mount modules 384, 386. In this manner, once a desired configuration of the universal mount modules 384, 386 is assembled and coupled to the adaptor plates 380, 382, the entire keyboard assembly 300 can be easily mounted to the chair 391. At least one of the first and second universal mount modules 384, 386 extends longitudinally beyond the inner and/or outer lateral ends 336, 338 of the corresponding keying module 302, 304, forming at least one peripheral extension 392. The universal mount modules 384, 386 can include one or more modular supports 389, each having a symmetric modular design with one or more symmetric fastening patterns 385, 387 including a plurality of fastening elements. These fastening patterns 385, 387 allow each of the modular supports 389 or universal mount modules 384, 386 to be used for mounting either side of a split keyboard, for example, the first or second keying modules 302, 304 in the illustrated embodiment of FIG. 14.

These same fastener patterns 385, 387 can be used to couple more than one universal mount module 384, 386 of the same or varying dimensions to adjust or vary the size and configuration of the universal mount modules 384, 386. In some embodiments, the peripheral extensions 392 are portions of overlapped modular supports 389. The at least one peripheral extension 392 is configured to be coupled to the at least one peripheral support member 388.

Figure 15A:
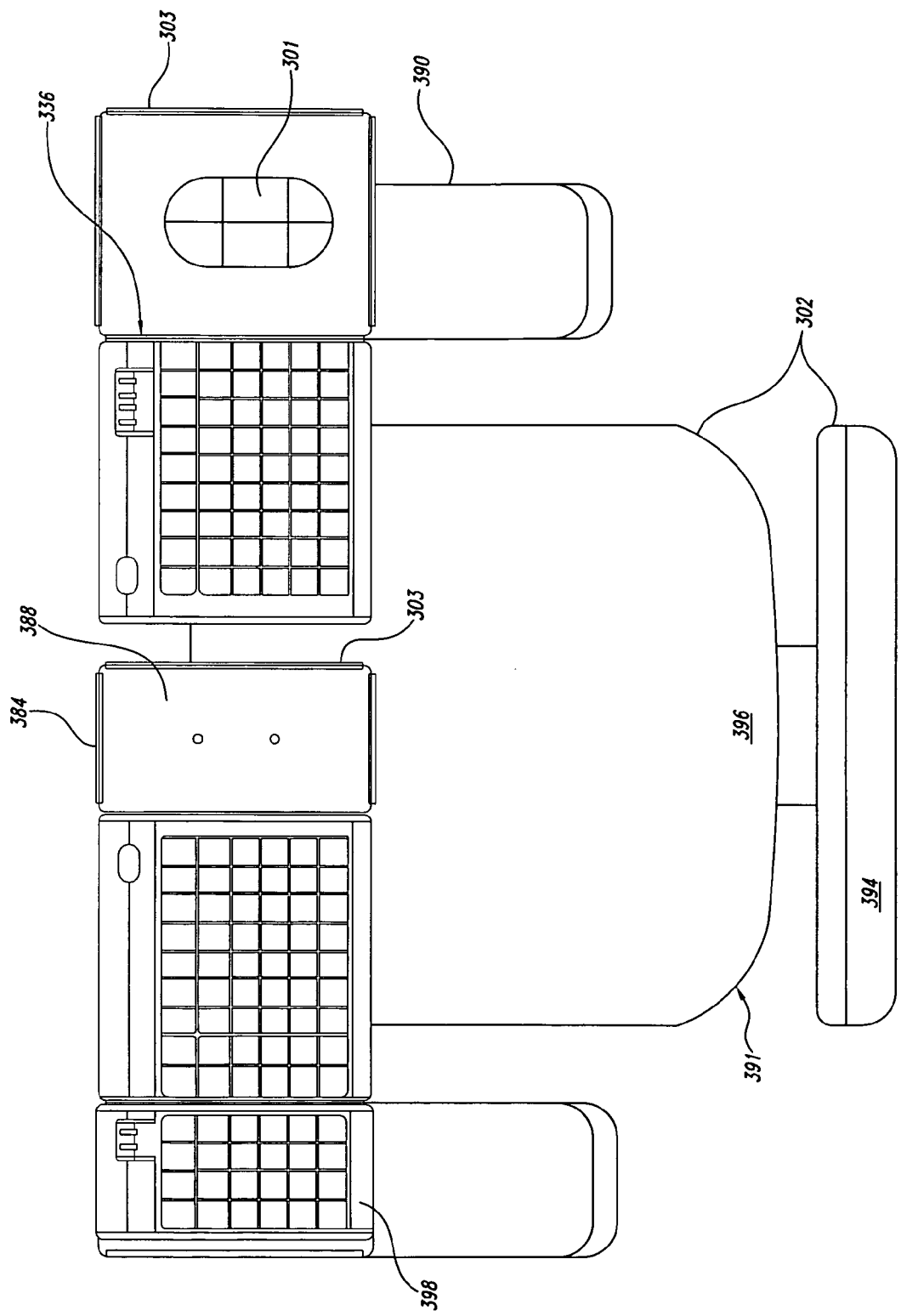
FIGS. 15A and 15B are a top plan view and a side elevation view, respectively, of the adjustable keyboard assembly of FIG. 14 mounted to a chair according to two respective embodiments.
Figure 15B:
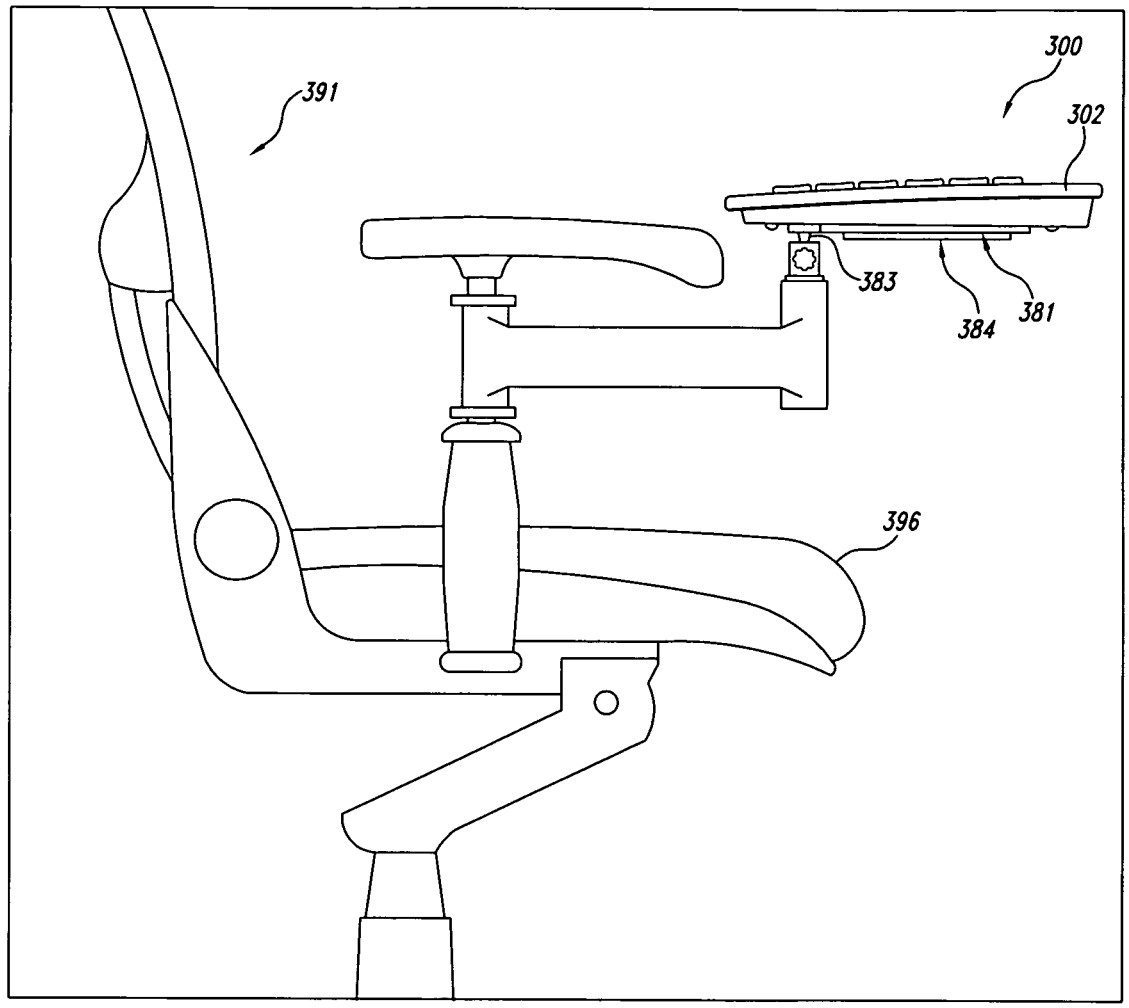

FIG. 15A illustrates a top view of the adjustable keyboard assembly 300 according to one embodiment, in the mounted configuration. In some embodiments, as illustrated in FIG. 15B, the keyboard assembly 300 is pivotably mounted, and the user can pivot the modules 384, 386 away from the chair 391 so that the user can enter or leave a seat 396 of the chair 391 or to adjust tenting or splaying angles of the first and/or second keying modules 302, 304. For example, the keyboard assembly 300 can be pivotably mounted using a clamp and rod assembly.

In the illustrated embodiment of FIG. 15A, the particular computer peripherals supported include a number keypad 398 on a peripheral support member 388 coupled to the peripheral extension 392 of the first structure mount module 384, and a computer mouse 301 on the peripheral support member 388 coupled to the peripheral extension 392 of the second structure mount module 386. The peripheral support members 388 and peripheral extensions 392 are visible in FIG. 14. In some embodiments, the modular supports 389 are substantially unitary rigid structures such that when the claim and rod assembly shown in FIG. 15B is pivoted about an axis, such as a horizontal and/or vertical axis, the entire corresponding keying module 302, 304 along with the peripheral extension 392 is tented or splayed.

In some embodiments, the peripheral extensions 392 can be hingedly coupled to the first and second universal mount modules 384, 386, respectively, using a lockable hinge that accommodates locking the hinge at multiple angles between the peripheral extension 392 and the first and second universal mount modules 384, 386, respectively. In such an embodiment the portions of the first and second universal mount modules 384, 386 supporting the keying modules 302, 304, respectively, can be pivoted with respect to the corresponding peripheral extension 392 to allow the user to enter or exit the seat 396.

The modular supports 389 can also include symmetric fastening patterns 393, 395 on opposing ends thereof toward regions that form the peripheral extensions 392. The fastening patterns 393, 395 are configured to couple the corresponding modular supports 389 to peripheral support members 388 of varying sizes, making it easy and expedient to switch between different size peripheral support members 388 for supporting peripherals that require various sizes, at different times.

As illustrated in FIG. 15A, in one aspect, the peripheral extensions 392 include a lip structure 303 extending about and removably or permanently attached to the perimeter of the peripheral extensions 392. The lip structure 303 can be fabricated from one piece or multiple pieces. Furthermore, the lip structure 303 is fabricated from a material that has frictional qualities to prevent the computer peripherals 301, 398 from slipping or falling from an edge of the peripheral extensions 392, particularly if the peripheral extensions 392 are tilted for ergonomic reasons. For example, the lip structure 303 can be fabricated from rubber, silicone, or the like. In some embodiments, the lip structure 303 may include a surface texture that has the desired frictional qualities, such as an uneven or jagged surface or a surface with small size hooks or loops.

Figure 16A:
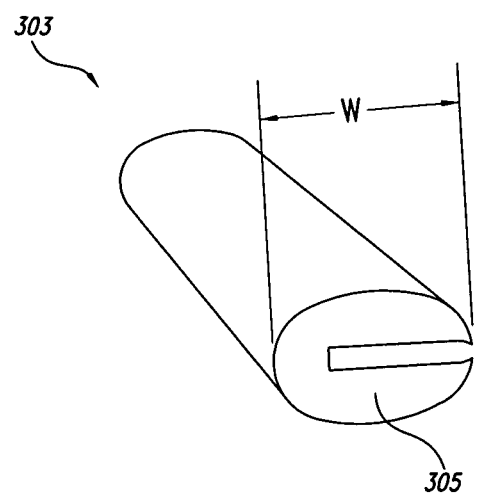
FIGS. 16A and 16B are isometric views of at least a portion of a lip structure of the adjustable keyboard assembly of FIG. 14 according to two respective embodiments.
Figure 16B:
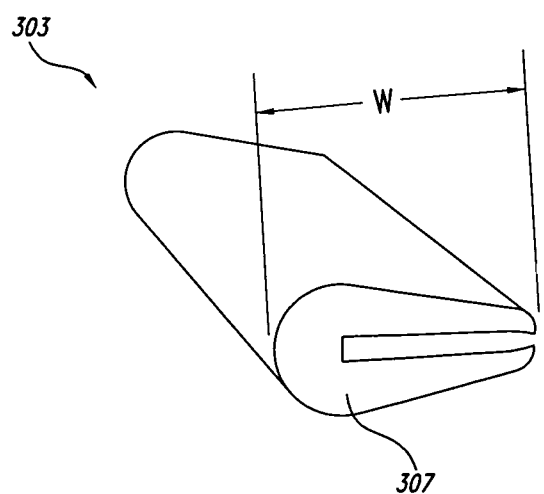

To prevent the lip structure 303 from interfering with the user's palm, it is preferred to minimize the size of the lip structure 303. However, it is also preferred to maximize the size of the lip structure 303 to prevent a rolling computer peripheral, such as the mouse 301, from rolling over the lip structure 303 after having gained momentum. It has been found that balancing these two conflicting design needs, a lip structure 303, as shown in FIGS. 16A and 16B that has an elliptical cross-sectional shape 305 or a tear drop cross-sectional shape 307, with a width W ranging between 0.25 inch and 0.5 inch prevents interference with the user's palm while also preventing a rolling computer peripheral that has gained momentum from falling of the edge of the peripheral extensions 392.

Although the illustrated embodiments are directed to providing a structure mountable keyboard assembly for two keying modules, one of the first or second structure mount modules can be sized and used to accommodate a one piece full-size keyboard. Furthermore, the adaptor plates can be eliminated or an integral part of the keying modules in some embodiments and the protuberance and fastening patterns that couple the keyboard to the universal mount modules can be incorporated directly in the lower portion of the keying modules such that the keying modules can directly couple to the universal mount modules.

Figure 17:
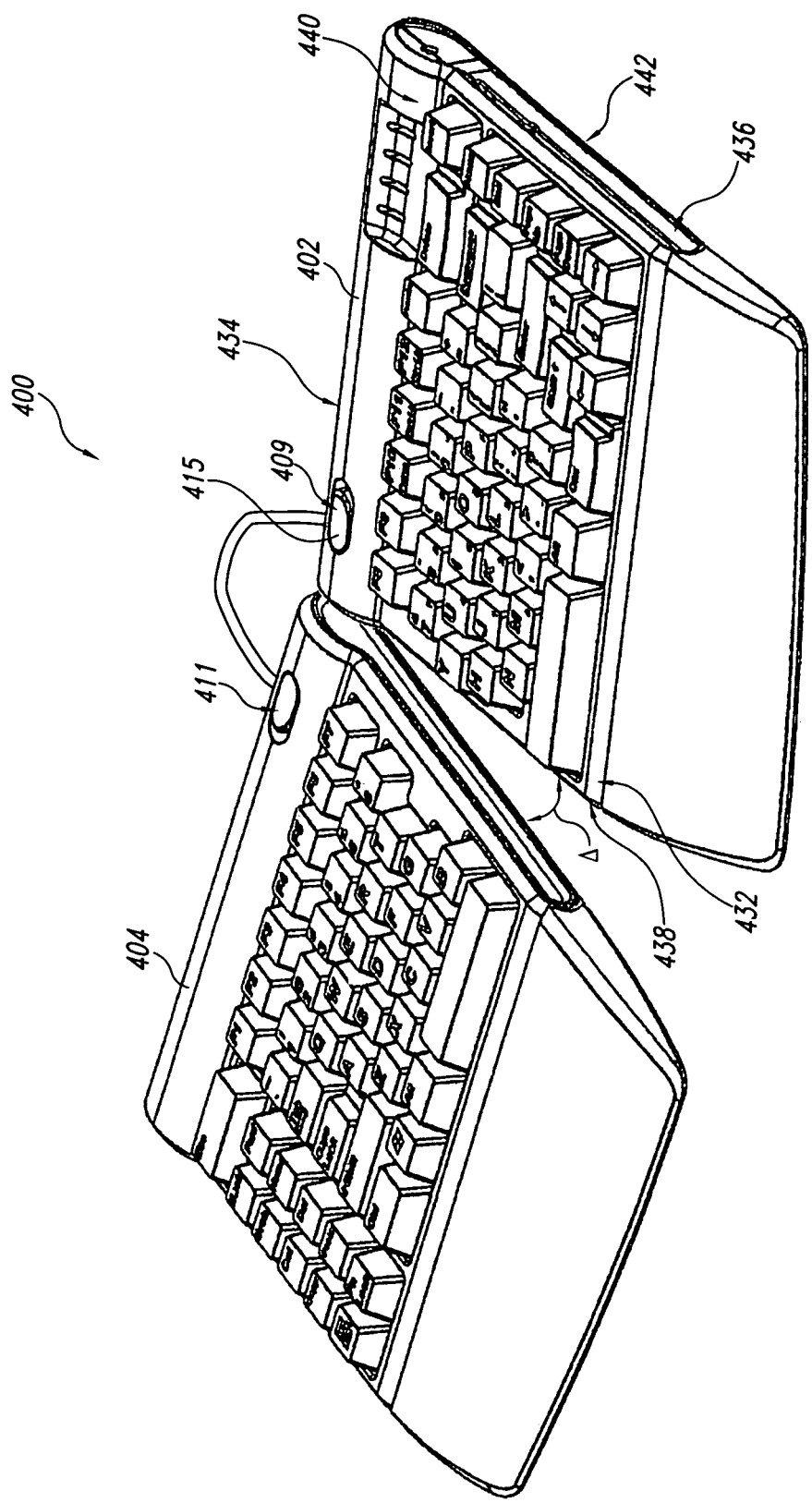
FIG. 17 is an isometric view of an adjustable keyboard assembly according to still another embodiment in a first tenting configuration.

FIG. 17 illustrates one embodiment of an adjustable keyboard assembly 400 including a first keying module 402 and a second keying module 404. The first and second keying modules 402, 404 include first and second latching systems 409, 411, respectively. The following description discusses the relationship between the latching system 409 of the first keying module 402 and components of a tethering module 413 (FIG. 19A) that facilitates tethering of the keying modules 402, 404 and tenting and pivoting or splaying of the keying modules 402, 404 with respect to each other. Substantially the same and oppositely situated configuration applies to the second keying module 404, and therefore, the latter is not elaborated for purposes of brevity.

The keying module 402 includes a proximal end 432 and a distal end 434, an outer lateral end 436 opposing an inner lateral end 438 with respect to the user, an upper portion 440 and a lower portion 442. As illustrated in FIG. 17, the latching system 409 includes a slide button 415.

Figure 18:
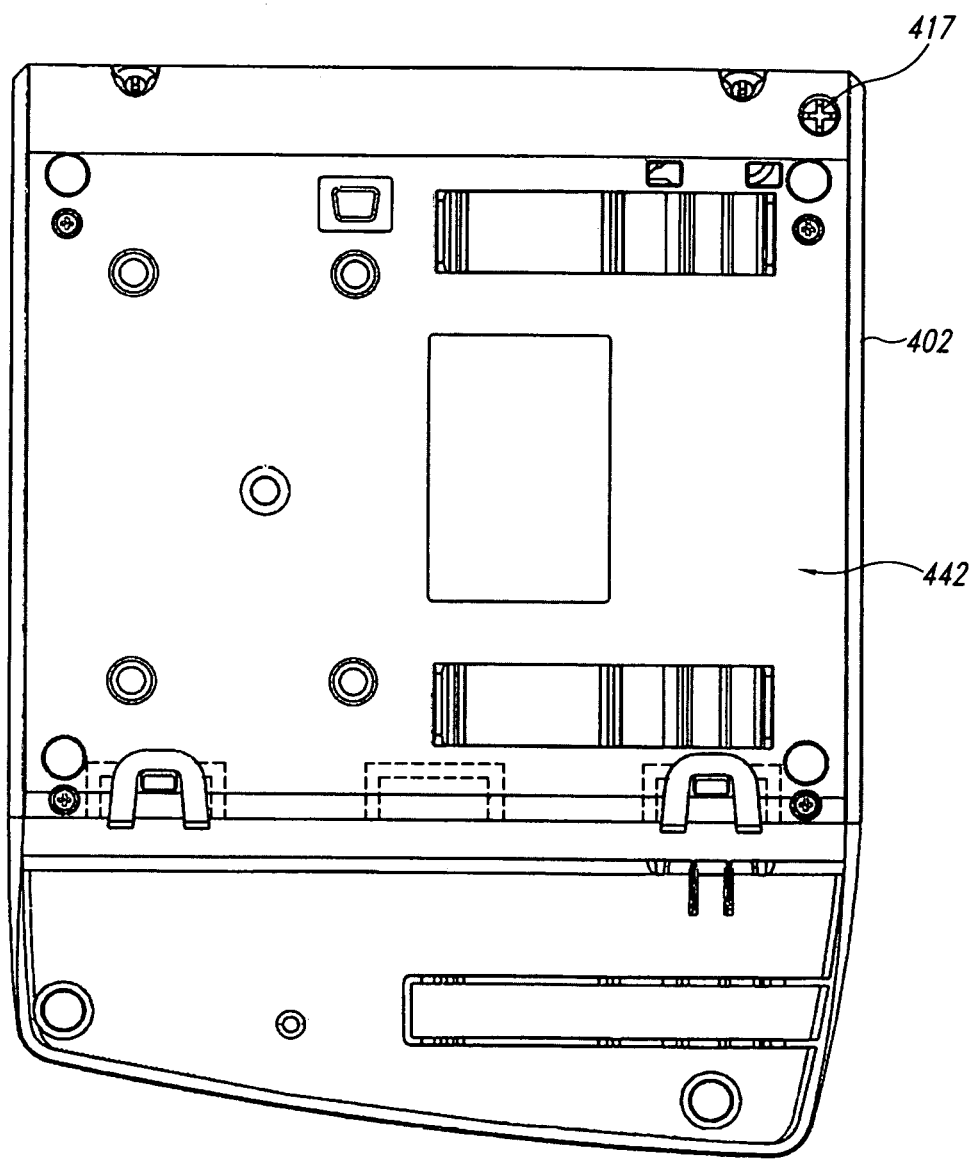
FIG. 18 is a bottom plan view of a keying module of the adjustable keyboard assembly of FIG. 17 according to one embodiment.

FIG. 18 illustrates an underside of the lower portion 442. In one embodiment, the lower portion 442 includes a tether opening 417 sized to receive a tethering member 419 (FIG. 19B). In one aspect, as illustrated in FIG. 19B, the tethering member 419 includes a shaft portion 421 and a seat portion 423. In previous designs, such as certain embodiments of the co-pending application Ser. No. 11/788,773, the manufacturing of similar components had narrow dimensional tolerances so that the latching mechanism would snugly fit about the shaft of the tethering member sufficiently to securely tether the two keying modules. However, if the latch was fit too tight about the tethering member, separating the corresponding keying module would become difficult and posed the risk of breakage if excessive force was applied. This results in high cost of manufacturing, and less than optimal usability.

Figure 19A:
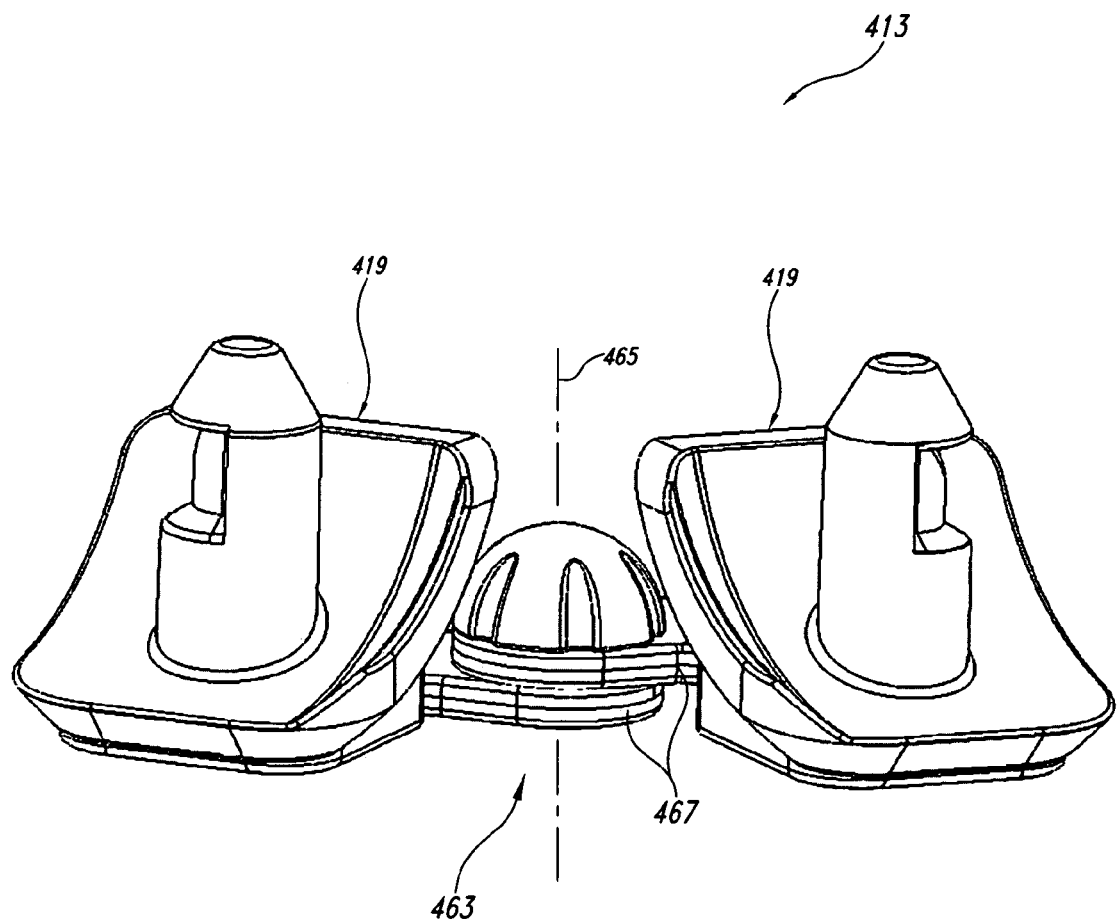
FIGS. 19A and 19B are isometric views of a tethering module of the adjustable keyboard assembly of FIG. 17 and a portion thereof, respectively, according to one embodiment.
Figure 19B:
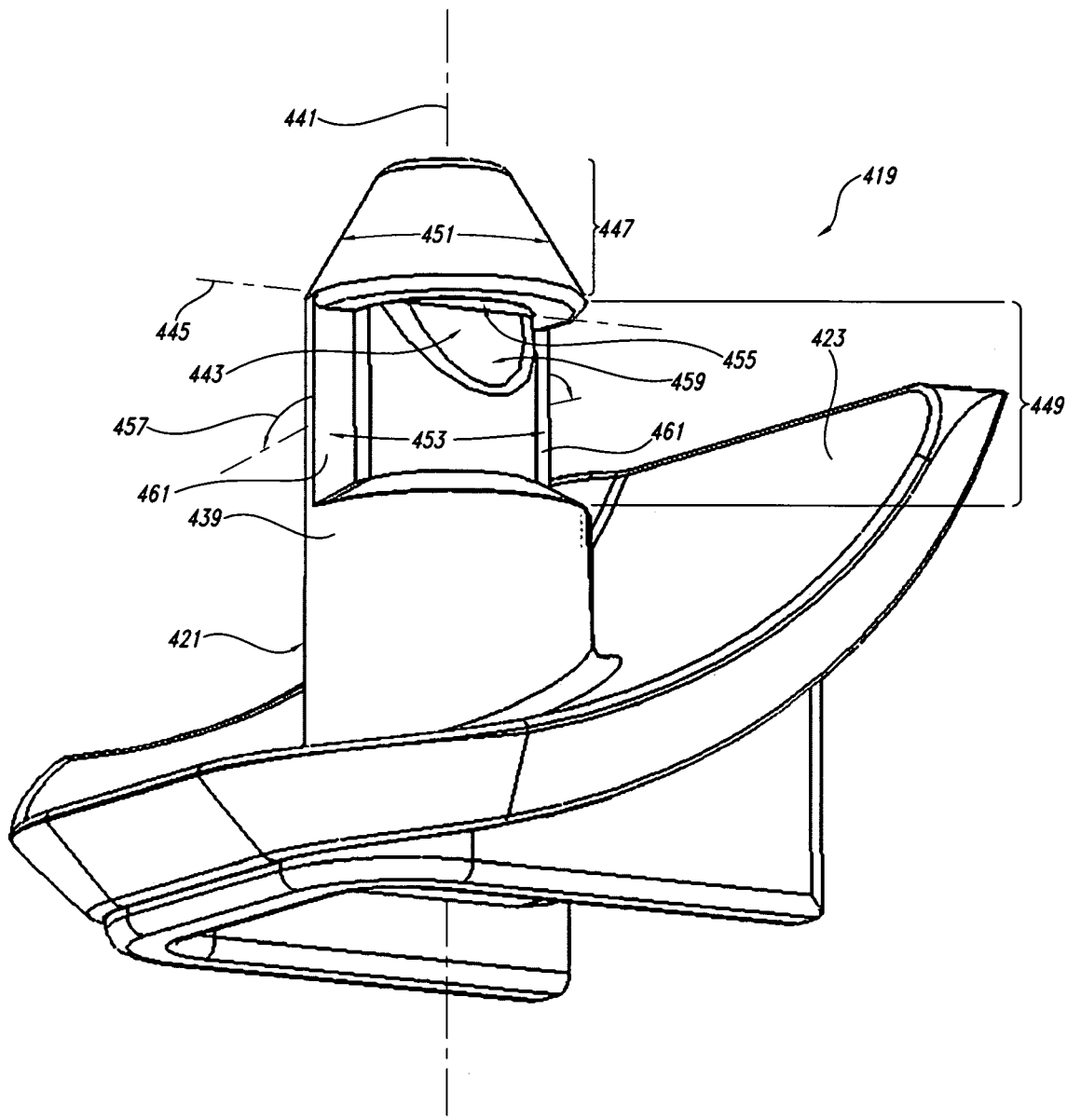

As illustrated in FIG. 19A, in one embodiment, the tether module 413 includes a coupling assembly 463 allowing the tether members 419 to pivot with respect to each other about the common axis 465. The coupling assembly 463 may include structure that maintains the tether members 419 within a particular distance range with respect to each other while allowing them to pivot about a common axis 465.

Based on the foregoing, the user can achieve a range of splay angles Δ (i.e., angle formed between the inner lateral ends 438 of the first and second keying modules 402, 404 as shown in FIG. 17) and tenting angles (i.e., the angle at which the base of the keyboard is inclined with respect to the support surface) very easily while the manufacturing and assembly of the components that permit such use are also efficient and cost effective. The coupling assembly 463 can include flexible joining members 467, which can be fabricated from a resilient material that allows flexing of the joining members 467 to permit tenting of the keying modules 402, 404 when coupled to the tether module 413.

Suitable material for joining members 467 include material allowing the tether members 419 to both rotate (splay) and flex moderately (e.g., to allow tenting of keying modules at least up to and beyond 15 degrees elevated from horizontal), while at the same time providing adequate strength and rigidity such that the two tethered keying modules 402, 404 may be picked up by holding just one keying module without the other module excessively sagging or causing the joining member 467 or tether member 419 to break or release from either keying module. The flexible joining members 467 are preferably produced from a material such as POM plastic which is injection moldable and which can flex slightly many times without breaking.

The tether member 419 of the present disclosure is configured to allow less strict dimensional tolerances and reduce the manufacturing cost and improve ease of assembly and use of the latching system 409. The improvements surprisingly solve potential shortcomings of previous designs. The improved latching system 409 and tethering module 413 provide users with significantly easier engagement to achieve tethering, very secure tethering with a failsafe design to release before breaking above a threshold force applied to the keying modules 402, 404, and much easier separation of the keying modules 402, 404 from the respective tether members 419 by the user when an un-tethered configuration is desired.

Figure 20:
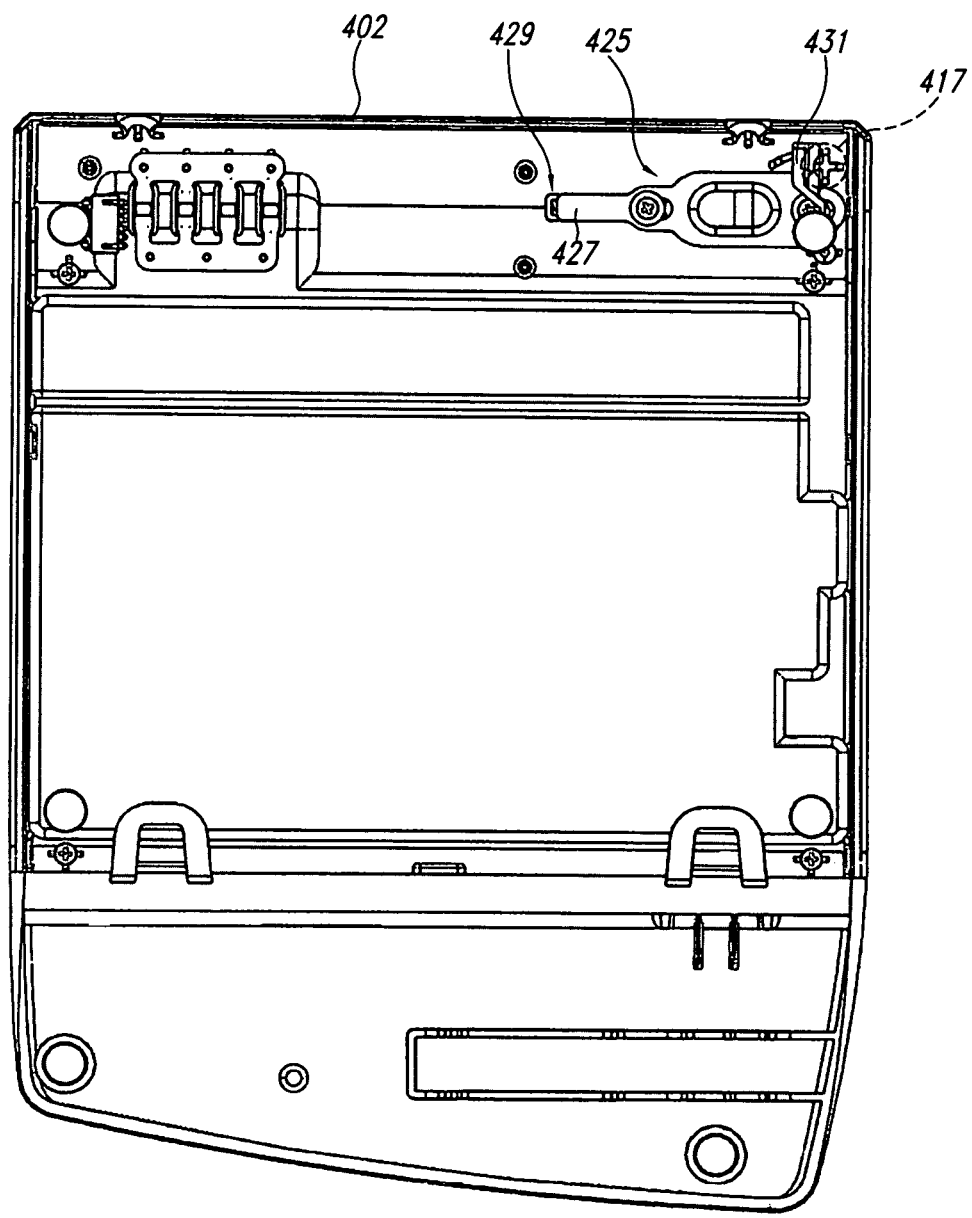
FIGS. 20 and 21 are respective bottom plan views of a keying module of the adjustable keyboard assembly of FIG. 17 with portions removed for clarity of illustration and description, according to one embodiment.

FIG. 20 illustrates the underside of the keying module 402 with the bottom panel removed to expose an internal portion 425 of the latching system 409 (FIG. 17). According to one embodiment, the slide button 415 is fixedly coupled to or integrated with an internal sliding member 427, which in turn is moved as the user moves the slide button 415 on the upper portion 440 of the keying module 402 or as the internal sliding member 427 is forced to move by the tether member 419 as will be described below.

Figure 21:
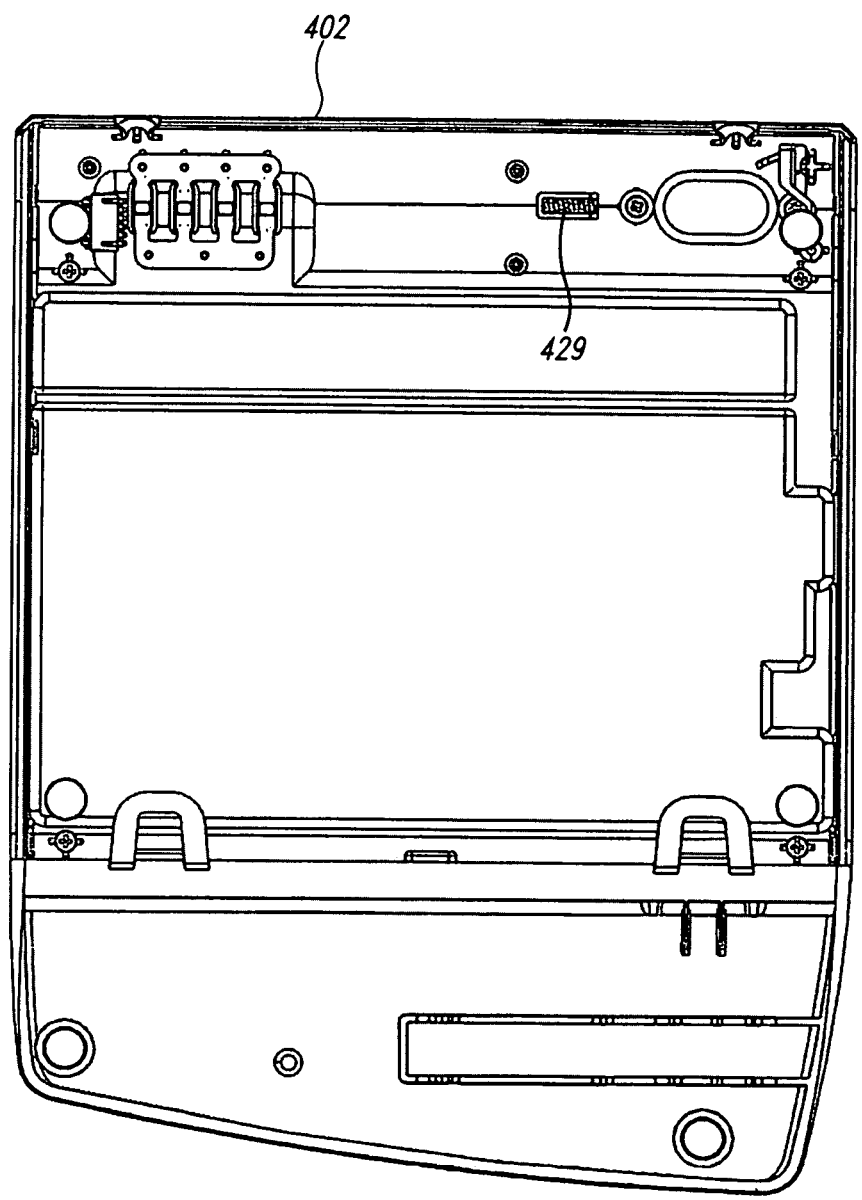
Figure 24:
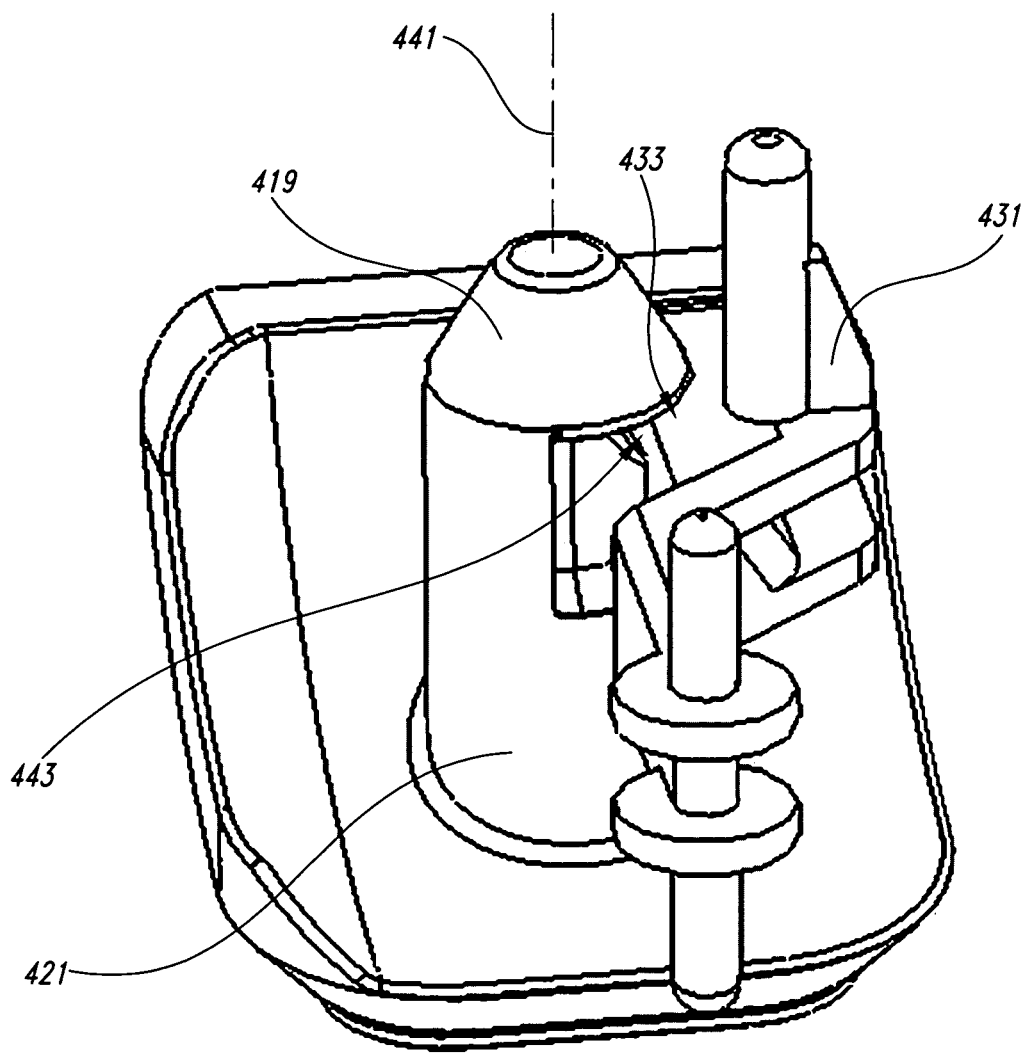
FIGS. 24 and 25 are front and rear isometric views, respectively, of a latch and tether member assembly of the adjustable keyboard assembly of FIG. 17 according to one embodiment.

The internal sliding member 427 engages a biasing element 429 toward a first end of the internal sliding member 427. The biasing element 429 is more clearly illustrated in FIG. 21 in which the internal sliding member 427 is removed for clarity of illustration. In one embodiment the biasing member 429 is a coil spring. Referring to FIGS. 17 and 20, the slide button 415 is in a first rest position before being actuated. The internal sliding member 427 is coupled to the latch 431 toward a second end thereof, for example, by being rotatably coupled to a pin 471 (FIG. 22) to pivot the latch 431 about pivot pins 469 (FIG. 22). In one embodiment, at least a portion of the latch 431 obstructs at least a portion of the opening 417. During or after actuation, the slide button 415 moves toward a second position. Movement of the slide button toward the second position compresses the biasing element 429 building a biasing potential therein. In addition, the latch 431 moves away from the opening 417, which in the unobstructed state can receive or release the shaft portion 421 of the tether member 419 (FIG. 19B). Releasing the slide button 415 releases the biasing potential and returns the internal sliding member 427 and latch 431 to a released position.

FIG. 22 illustrate the latch 431 according to one embodiment. The latch 431 includes a latch coupling region 433 formed at an intersection of at least two sides 435, 437 of the latch 431. In one aspect, pivot pins 469 are configured to be coupled to corresponding bosses or other receiving structure in the enclosure of the respective keying modules 402, 404 so that it can bear significant rotational force without being twisted off its rotational axis.

In one aspect, the latch coupling region 433 includes a wedge formed from the two sides 435, 437 proximate an area where the two sides 435, 437 intersect. At least one of the two sides 435, 437 is tapered to form the wedge as discussed in more detail further below. The wedge has a substantially linear boundary as illustrated in FIGS. 22 and 23. The latch coupling region 433 is configured to be engaged with a portion of the tether member 419 to securely couple the keying module 402 to the tether member 419 as elaborated below.

As illustrated in FIG. 19B, the shaft 421 of the tether member 419 includes a cylindrical projection 439 elongated about a shaft axis 441 and a complementary coupling portion 443. The complementary coupling portion 443 has a shape generally complementary to a shape of the latch coupling region 433 to be fixedly engaged therewith when the cylindrical projection 439 penetrates the opening 417 in the lower portion of the keying module 401 (FIG. 18), and when the slide button 415 and the internal sliding portion 427 (FIG. 20) are released.

In one embodiment, the latch coupling region 433 and the complementary coupling portion 443 include a coupling axis 445 that can be perpendicular to the shaft axis 441 when they are engaged. The complementary coupling portion 443 includes structural features formed in or on the cylindrical projection 439. For example, the cylindrical projection 439 can include a tip portion 447 adjacent an intermediate portion 449. In one embodiment, the tip and intermediate portions 447, 449 are positioned adjacent each other along the shaft axis 441. At least one circumferential region 451 in the tip portion 447 has a different diameter than a diameter of a circumferential region 453 in the intermediate portion 449. The two circumferential regions 451, 453 are positioned at least in part adjacent one another. The complementary coupling portion 443 is formed between the two circumferential regions 451, 453.

In one embodiment, the circumferential region 451 of the tip portion 447 has a larger diameter than a reduced diameter of the circumferential region 453 of the intermediate portion 449. Accordingly, as shown in the illustrated embodiment of FIG. 19B, a ceiling 455 is formed between the circumferential regions 451, 453 of the tip and intermediate portions 447, 449, respectively. In some embodiments, the complementary coupling portion 443 includes at least in part a portion of the ceiling 455 and a portion of the intermediate portion 449 in the circumferential region 453 thereof.

In some embodiments, the intermediate portion 449 includes at least first and second circumferential regions 453, 457. The first circumferential region 453 has the reduced diameter, which is also smaller than the diameter of the second circumferential region 457, forming walls 461 between the first and second circumferential regions 453, 457. In the illustrated embodiment, the ceiling 455 terminates, toward a first end thereof, at an intersection between the ceiling 455 and first circumferential region of 453. The first circumferential region 453 can include a tapered surface 459 extending from between axial terminal ends of the intermediate portion 449 toward a terminal end of the intermediate portion 449 where it meets the ceiling 455. The tapered surface 459 improves the coupling strength between the latch 431 and the shaft 421 while at the same time not increasing or reducing the forces required for decoupling the latch 431 from the shaft 421 and removing the tether module 413 from the keying modules 402, 404.

Figure 25:
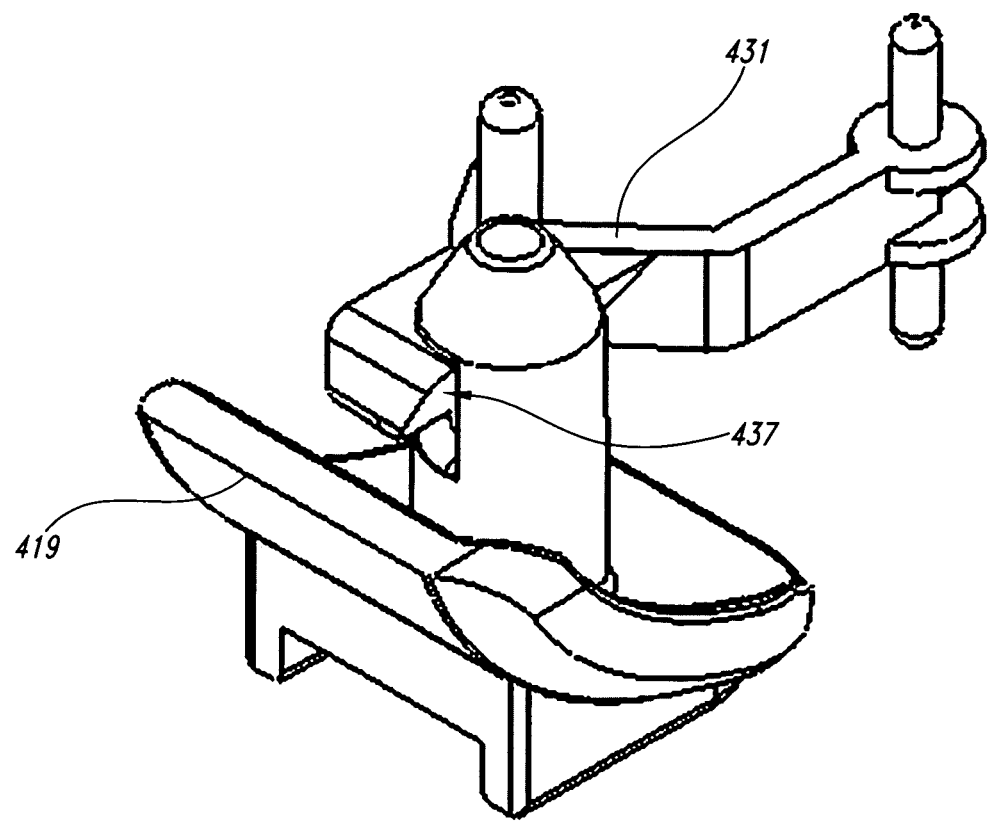

Referring to FIGS. 19B and 22-24, as the latch 431 is released, the latch coupling portion 433 approaches the complementary coupling portion 443 formed in the shaft 421 of the tether member 419. FIG. 25 shows the latch 431 and shaft 421 in the engaged configuration. In the illustrated embodiment, the ceiling 455 and tapered surface 459 of the complementary coupling portion 443 lockingly engage the surfaces formed by the wedge, which in turn is formed by the adjacent sides 435, 437 of the latch 431. The latch coupling portion 433 and the complementary coupling portion 443 on the shaft 421 engage along a plurality of surfaces to sufficiently secure the tether member 419 to the latch 431, and thus to the keying module 402.

As shown in FIG. 25, one of the sides 437 of the latch 431, in which a portion of the latch coupling region 433 is formed, is tapered at generally a complementary taper angle, with respect to the shaft axis 441, to the taper angle of the tapered surface 459 of the complementary coupling portion 443 of the tether member 419 with respect to the shaft axis 441. In this manner, these two surfaces facilitate a better fit between the latch coupling region 433 and the complementary coupling portion 443.

Therefore, the dimensional tolerances of the shaft 421 and the latch 431 need not be as strict as previous designs where a cylindrical surface of a pin would be engaged by a curvilinear feature formed in the latch. In this previous design, the mating portions required extremely accurate dimensions to prevent unwanted movement of the pin with respect to the keyboard. Furthermore, the tether opening in the keyboard would also be sized to tightly fit about the pins. In contrast, the tether member 419 and the keying modules 402, 404 according to the present disclosure can be tightly secured together without requiring a tight fit of the shaft 439 into the tether openings 417, improving removal of the tether module 413 from the keying modules 402, 404.

Figure 26:
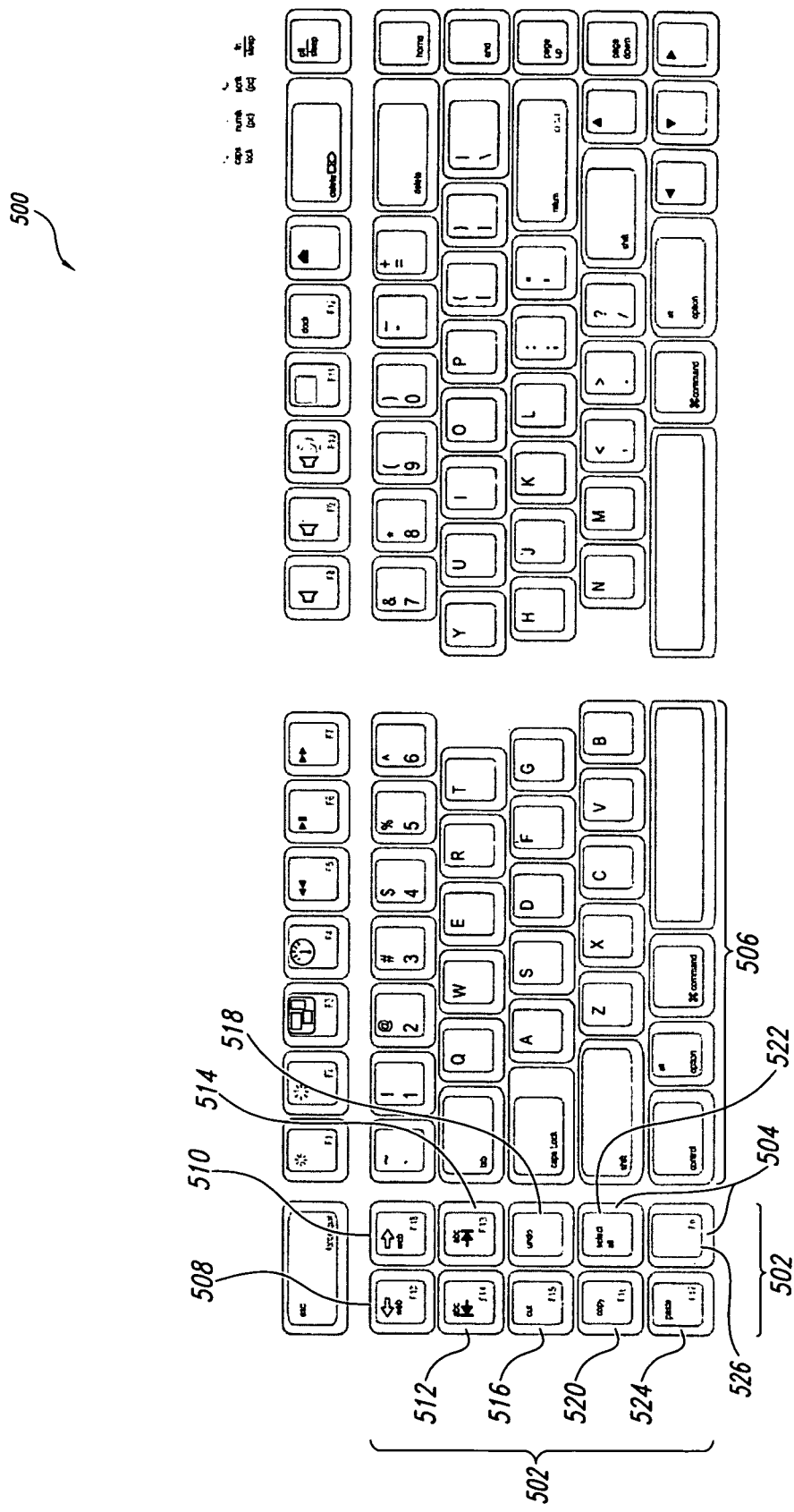
FIG. 26 is a top view of a keying module and a layout thereof according to one embodiment.

FIG. 26 illustrates a keyboard layout 500 according to one embodiment, which can be incorporated in the keying modules 102,104, 202, 204, 302, 304, 402, 404. The keyboard layout 500 can include a key pattern 502 having a plurality of driverless hot keys 504 that can be used to activate their corresponding functions when connected to a computer without installation of any drivers. Typically, driverless hot keys are programmed by the operating system manufacturer and require pressing multiple keys to activate commonly used function such as cutting, copying and pasting. Existing keyboards that include one touch hot keys typically incorporate these keys as extra buttons peripherally beyond the normal array of keys on the keyboard, which consumes excess space and requires installation of drivers to enable their functions while requiring hand motions that are difficult to remember and which require long reaches and awkward positions to access. The following discussion is directed to programming and a particular layout of hot keys that are driverless and strategically positioned to facilitate efficient and intuitive activation thereof.

It has been found that positioning the hot keys 504 laterally adjacent standard keys 506 of at least one keying module such that they are generally aligned with a plurality of rows that include the standard keys 506 improves efficiency of activating their function by making it easy to remember and access their positions. For example, a typical typing position of the user's hands can be maintained while one finger accesses the hot keys 504. In contrast, in conventional keyboard layouts at least one of the user's hands needs to leave its standard typing position to use more than two fingers to activate more than one hot key or to reach a hot key that is positioned in a non-aligned location with respect to the standard keys.

In one embodiment, as illustrated in FIG. 26, user adaptability and efficiency have been particularly improved when ten hot keys 504 are arranged adjacent the standard keys 506 toward an outer lateral side thereof with respect to the user. These hot keys 504 are arranged in five rows of two keys each, the first row including a WEB BACKWARD key 508 and a WEB FORWARD key 510, the second row including a BEGINNING OF LINE key 512 and an END OF LINE key 514, the third row including a CUT key 516 and an UNDO key 518, the fourth row including a COPY key 520 and a SELECT ALL key 522, and the fifth row including a PASTE key 524 and a FUNCTION key 526. The FUNCTION key 526, which typically activates embedded or alternate key actions usually located on the right side in existing keyboard layouts, may be positioned with these hot keys 526 when the keyboard is a split keyboard. This allows accessing right-side embedded keys without requiring the awkward posture of holding both the Function key and another key simultaneously with the same hand. The illustrated embodiment shows the described embodiment and is directed to an Apple® computer operating system, such as the OSX Leopard.

Figure 27:
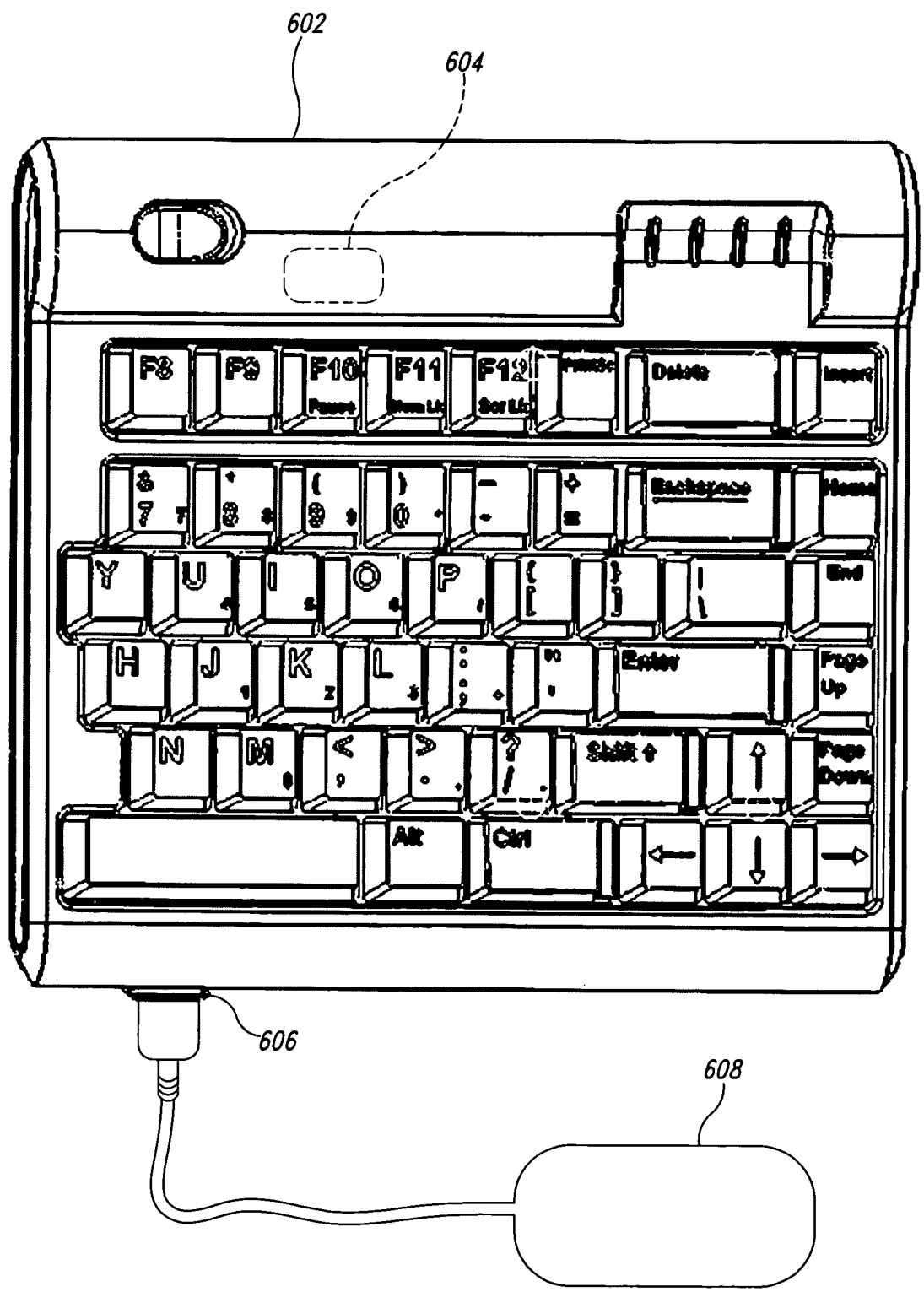
FIG. 27 is a top plan view schematically illustrating a programmable keying module according to one embodiment.

FIG. 27 illustrates one embodiment of a programmable peripheral device 602, such as a programmable keying module, having an onboard memory chip 604 and a USB on-the-go port (USB OTG) 606. USB OTG technology is a recent development developed for mobile devices to alleviate the need for having to use separate computers such as workstations or laptops to communicate between the mobile devices and other devices. For example, through use of USB OTG technology, cameras can communicate directly with printers and cell phones with mp3 players. The USB OTG technology accomplishes direct communication between USB devices and USB peripherals or other USB devices by adding host functionality to alleviate the requirement of having a separate computer as a host. Since computer peripherals such as keyboards are typically associated with communicating with computers and the USB OTG technology has been primarily directed to communication between USB devices and elimination of the computer, the USB OTG technology has not been explored for using with computer peripherals such as computer keyboards, computer mouse, foot pedals, controllers, such as videogame controllers and the like.

The illustrated embodiment of FIG. 27 and the discussion that follows are directed to a keying module 602 as an example of the peripheral device to demonstrate the present embodiment. A similar configuration can be used to program other computer peripherals, which are contemplated to be within the scope of the present disclosure.

The programmable keying module 602 is operatively coupled to or houses the memory chip 604 and USB OTG port 606, to allow programming the keying module 602 and keys thereof and enable creation of driverless hot keys such as those discussed above in conjunction with FIG. 26. For example, when a USB device 608 is connected to the USB OTG port 606, it is not reported to and enumerated by the host computer; rather it is recognized by the programmable keying module 602. Accordingly, a USB keyboard can be coupled to the programmable keying module 602 for communicating particular programmable functions and assign them to hot keys. For example, typically the CTRL key on conventional keyboards and the "C" alphabet key are simultaneously pressed to copy a particular selected item or portion of a document.

The memory chip 604 can be configured so that when the USB device 608 is connected, pressing a particular key on the programmable keying module 602 prepares assigning a function associated with keys pressed on the USB device 608. In the foregoing example, once another keyboard is connected to the USB OTG port 606, pressing any one key on the programmable keying module 602 and then pressing CTRL and "C" simultaneously assigns the copy function to the one key on the programmable keying module 602. The memory chip 604 can be configured to end the programming session for the one key upon repressing it, after which another key can be programmed. A similar programming methodology can be applied with other USB devices, such as a mouse or a controller, where functions of the mouse buttons or controller features can be assigned to desired keys of the programmable keying module 602.

As discussed earlier, the keying module 602 is provided as an example of a programmable peripheral device. Such a device can also include a computer mouse or foot pedal or controller, each having a USB OTG port and a memory chip. The memory chip can include EEPROM chips. One of ordinary skill in the art will appreciate that a peripheral device as described provides substantial benefits over existing unintelligent peripheral devices by allowing users to program their peripheral devices according to their preferences with respect to assigning hot keys. Upon connection to the computer via wire or wireless methods, the stored actions or functions can be conveyed to the computer. The keyboard functions can be erased or reset using the computer. Alternatively, particular keys can be programmed to provide control actions, such as resetting or erasing programmed key functions.

In addition, upon programming such peripheral devices, the user does not need to install drivers for recognizing functions associated with the keys, allowing the user to use the peripheral device with other computers.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed:

1. An adjustable keyboard support assembly for adjusting a tenting angle of a pair of keying modules by supporting an inner lateral end of each of the pair of keying modules at different user-selectable heights, the adjustable keyboard support assembly comprising:
a pair of lift modules, each lift module configured to be fixedly coupled with respect to a lower portion of a respective one of the pair of keying modules at the inner lateral end thereof for spacing the inner lateral end of the respective keying module from a resting surface and configured to fix the respective keying module at a variety of tenting angles between the lower portion of the respective keying module and the resting surface, each of the lift modules including a coupling portion and at least first and second limbs, each of the first and second limbs being pivotably coupled with respect to the coupling portion of the respective lift module to pivot about a common pivot axis, the orientation of the first and second limbs with respect to the coupling portion and with respect to each other being variable to allow for varying of the tenting angle of the respective keying module, and wherein one of the first and second limbs of each respective keying module includes a stabilizing structure configured to transmit force directly between the first and second limbs when the stabilizing structure contacts the other one of the first and second limbs as the first and second limbs collectively support the keying module in at least one of the variety of tenting angles.

2. An adjustable keyboard comprising the adjustable keyboard support assembly of claim 1, and further comprising:
the pair of keying modules, each coupling portion of the respective lift module removably coupled to the inner lateral end of the respective keying module.

3. The adjustable keyboard support assembly of claim 1 wherein the first and second limbs of each respective lift module are lockable to each other to rotate in unison about the common pivot axis.

4. The adjustable keyboard support assembly of claim 1 wherein the first and second limbs of each respective lift module each include a first end and are pivotably coupled to the coupling portion toward the respective first ends, each of the first and second limbs including at least one structural feature that forms at least one complementary surface to the resting surface, the structural feature being oriented such that the complementary surface rests against the resting surface when the corresponding lift module is oriented to achieve a desired tenting angle.

5. The adjustable keyboard support assembly of claim 4 wherein the first and second limbs of each respective lift module each include more than one structural feature forming respective complementary surfaces, on opposing sides of each of the first and second limbs.

6. The adjustable keyboard support assembly of claim 5 wherein the first and second limbs of each respective lift module each include a second end, opposed to the first end, the respective structural features being positioned toward the second end and having at least one flat surface configured to extend parallel to a resting surface when the corresponding lift module is oriented to achieve a desired tenting angle.

7. The adjustable keyboard support assembly of claim 1 wherein each of the pair of lift modules are reconfigurable between at least first and second states, in the first state, both the first and second limbs of each respective lift module having a portion resting on the resting surface, to achieve a first range of tenting angles, and in the second state, one of the first and second limbs of each respective lift module having a portion resting on the resting surface to achieve a second range of tenting angles while the other of the first and second limbs is spaced from the resting surface.

8. The adjustable keyboard support assembly of claim 1 wherein the pair of lift modules are each reconfigurable between at least two distinct states, one of the distinct states characterized by the first and second limbs of each respective lift module being in a generally collinear configuration and another one of the distinct states characterized by the first and second limbs of each respective lift module being in an inverted V-shaped configuration.

9. The adjustable keyboard support assembly of claim 1 wherein the lift modules are each reconfigurable between at least two distinct states to support the respective keying modules at different incremental tenting angles.

10. The adjustable keyboard support assembly of claim 9 wherein a first one of the distinct states is configured to support the respective keying modules at a first tenting angle of about five degrees and a second one of the distinct states is configured to support the respective keying modules at a second tenting angle of about ten degrees.

11. The adjustable keyboard support assembly of claim 1 wherein the lift modules are each reconfigurable to support the respective keying modules at three distinct tenting angles spanning at least a ten degree range.

12. The adjustable keyboard support assembly of claim 1 wherein each lift module is lockable to retain the first and second limbs of each respective lift module in position relative to each other.

13. The adjustable keyboard assembly of claim 1 wherein the coupling portion of each respective lift module includes a hook at an end thereof which is configured to removably engage a complimentary feature on a side of the respective keying module when the lift modules are coupled to the respective keying modules.

14. A lift module configured to selectively support a keying module in one of several tenting angles, the lift module comprising:
- a coupling portion to attach the lift module to the keying module; and
- first and second limbs each pivotably coupled to the coupling portion to pivot about a common pivot axis, the first and second limbs reconfigurable between at least two distinct states to support the keying module at different tenting angles when the lift module is attached to the keying module and the first and second limbs are moved among the distinct states, and wherein one of the first and second limbs includes a stabilizing structure configured to transmit force directly between the first and second limbs when the stabilizing structure contacts the other one of the first and second limbs as the first and second limbs collectively support the keying module in at least one of the several tenting angles.

15. The lift module of claim 14 wherein one of the distinct states of the first and second limbs is characterized by the first and second limbs being in a generally collinear configuration and another one of the distinct states of the first and second limbs is characterized by the first and second limbs being in an inverted V-shaped configuration.

16. The lift module of claim 14 wherein a first one of the distinct states is configured to support the keying module at a first tenting angle of about five degrees and a second one of the distinct states is configured to support the keying module at a second tenting angle of about ten degrees.

17. The lift module of claim 14 wherein the first and second limbs of the lift module are reconfigurable to support the keying module at three distinct tenting angles spanning at least a ten degree range.

18. The lift module of claim 14 wherein the lift module is lockable to retain the first and second limbs in position relative to each other.

19. The lift module of claim 14 wherein the coupling portion of the lift module includes a hook at an end thereof which is configured to removably engage a complimentary feature on a side of the keying module when the lift module is coupled to the keying module.

20. The lift module of claim 14 wherein two distinct states are each characterized by the first and second limbs being in an inverted V-shaped configuration having a same included angle between the first and second limbs, and wherein the first and second limbs are pivotable about the common pivot axis to move between said two distinct states.

21. An adjustable split keyboard assembly comprising:
- a pair of keying modules, each keying module having a proximal end and a distal end with respect to a user, an outer lateral end opposing an inner lateral end, an upper portion and a lower portion, the upper portion including a plurality of keys; and
- a pair of lift modules, each lift module removably attachable to the lower portion of a respective one of the pair of keying modules at the inner lateral end thereof for spacing the inner lateral end of the respective keying module from a resting surface and support the respective keying module at a variety of tenting angles between the lower portion of the respective keying module and the resting surface, each of the lift modules including a coupling portion and at least first and second limbs, each of the first and second limbs being pivotably coupled with respect to the coupling portion of the respective lift module to pivot about a common pivot axis, the orientation of the first and second limbs with respect to the coupling portion and with respect to each other being variable to allow for varying of the tenting angle of the respective keying module, and wherein one of the first and second limbs of each respective keying module includes a stabilizing structure configured to transmit force directly between the first and second limbs when the stabilizing structure contacts the other one of the first and second limbs as the first and second limbs collectively support the keying module in at least one of the variety of tenting angles.

\* \* \* \* \*

UNITED STATES PATENT AND TRADEMARK OFFICE
CERTIFICATE OF CORRECTION

| | | |
|---|---|---|
| PATENT NO. | : 8,454,254 B2 | Page 1 of 1 |
| APPLICATION NO. | : 12/324641 | |
| DATED | : June 4, 2013 | |
| INVENTOR(S) | : Hargreaves et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 993 days.

Signed and Sealed this
Twenty-seventh Day of January, 2015

Michelle K. Lee
*Deputy Director of the United States Patent and Trademark Office*